(12) United States Patent
Sinding

(10) Patent No.: US 12,313,225 B2
(45) Date of Patent: May 27, 2025

(54) HYDROGEN LEAKAGE DETECTION FROM A HYDROGEN REFUELING STATION

(71) Applicant: Nel Hydrogen A/S, Herning (DK)

(72) Inventor: Claus Due Sinding, Silkeborg (DK)

(73) Assignee: CAVENDISH HYDROGEN A/S, Herning (DK)

( * ) Notice: Subject to any disclaimer, the term of this patent is extended or adjusted under 35 U.S.C. 154(b) by 304 days.

(21) Appl. No.: 17/771,586

(22) PCT Filed: Sep. 14, 2020

(86) PCT No.: PCT/DK2020/050252
§ 371 (c)(1),
(2) Date: Apr. 25, 2022

(87) PCT Pub. No.: WO2021/078340
PCT Pub. Date: Apr. 29, 2021

(65) Prior Publication Data
US 2022/0373134 A1    Nov. 24, 2022

(30) Foreign Application Priority Data
Oct. 25, 2019    (DK) .......................... PA 2019 70665

(51) Int. Cl.
*F17C 5/06*    (2006.01)
(52) U.S. Cl.
CPC .......... *F17C 5/06* (2013.01); *F17C 2221/012* (2013.01); *F17C 2221/033* (2013.01);
(Continued)
(58) Field of Classification Search
CPC . F17C 5/06; F17C 2221/012; F17C 2260/038
See application file for complete search history.

(56) References Cited

U.S. PATENT DOCUMENTS 8,494,772 B2    7/2013    Casey
8,770,012 B2    7/2014    Yahashi
(Continued)

FOREIGN PATENT DOCUMENTS

DE    102018118718 A1    3/2019

OTHER PUBLICATIONS

International Search Report for corresponding application PCT/DK2020/050252 filed Sep. 14, 2020; Mail date Dec. 22, 2020.
(Continued)

*Primary Examiner* — Eric S. McCall
(74) *Attorney, Agent, or Firm* — CANTOR COLBURN LLP

(57) ABSTRACT

A method of detecting a leakage in a hydrogen refueling including establishing at a first and a second time a first and a second representation of at least one fluid parameter associated with hydrogen stored in at least one hydrogen storage tank of the hydrogen refuelling station, determining a relative difference between the first and second representation of the at least one fluid parameter, and comparing the relative difference with a threshold difference to detect a leakage, where a hydrogen refuelling station is provided including a hydrogen storage module comprising with a plurality of hydrogen storage tanks, a hydrogen station module having a compressor, and a dispensing module with at least one dispensing nozzle, the hydrogen refuelling station including at least one controller arranged to control the hydrogen refuelling station and arranged to detect a leakage using the beforementioned method.

13 Claims, 13 Drawing Sheets

(52) U.S. Cl.
CPC ............................ *F17C 2250/043* (2013.01);
*F17C 2250/0439* (2013.01); *F17C 2250/0473*
(2013.01); *F17C 2250/0491* (2013.01); *F17C
2260/038* (2013.01)

(56) References Cited

U.S. PATENT DOCUMENTS

| | | |
|---|---|---|
| 2003/0158698 A1 | 8/2003 | Glazerbrook |
| 2006/0283237 A1* | 12/2006 | Courrieu |
| 2008/0141760 A1* | 6/2008 | Sienkowski ...... H01M 8/04679 |
| | | 73/40.5 R |
| 2014/0102587 A1 | 4/2014 | Nagura |
| 2017/0010178 A1* | 1/2017 | Cho ........................ G01M 3/26 |
| 2017/0023481 A1* | 1/2017 | Nagasaki ................ G01M 3/38 |
| 2017/0059089 A1 | 3/2017 | Uchida |
| 2017/0074456 A1 | 3/2017 | Handa |
| 2022/0292895 A1* | 9/2022 | Ren ....................... G08B 21/182 |
| 2022/0307428 A1* | 9/2022 | Sibbach .................... F02C 3/22 |
| 2023/0160773 A1* | 5/2023 | Berg .................. G01M 3/2876 |
| | | 73/40 |
| 2023/0184613 A1* | 6/2023 | Choi ................. H01M 8/04089 |
| | | 374/4 |
| 2023/0399986 A1* | 12/2023 | Minas ....................... F02C 9/46 |
| 2024/0079616 A1* | 3/2024 | Yapici ............... H01M 8/04365 |

OTHER PUBLICATIONS

Written Opinion for corresponding application PCT/DK2020/050252 filed Sep. 14, 2020; Mail date Dec. 22, 2020.

\* cited by examiner

HYDROGEN LEAKAGE DETECTION FROM A HYDROGEN REFUELING STATION

TECHNICAL FIELD

The present disclosure relates to detection of leakages in a hydrogen refueling station. The disclosure further relates to a hydrogen refueling station.

BACKGROUND

Along with battery electric vehicles, hydrogen fuel cell vehicles are the only zero-emission alternative drive option for motorized transport. The acceptance of hydrogen fuel cell vehicle as an alternative to conventional internal combustion vehicles rely heavily on the availability of refueling options.

Hydrogen refueling stations are used for filling hydrogen fuel cell vehicles with hydrogen fuel by leading hydrogen from hydrogen storage tanks to dispensers arranged to engage with the hydrogen fuel cell vehicle such that the hydrogen fuel may be transferred to the vehicle tank.

The hydrogen storage tanks of the hydrogen refueling station may typically store hydrogen fuel at high pressures in order to meet customer demands, however storing hydrogen at such pressures involves safety concerns. A leakage in a hydrogen storage tank, results in hydrogen, which is highly flammable, being vented to the surroundings of the hydrogen refueling station, and this could be detrimental to the safety of people surrounding the hydrogen refueling station.

BRIEF SUMMARY

The inventors have identified the above-mentioned issue related to storing hydrogen at high pressure, and subsequently made the below-described disclosure which provides for a way of detecting if such a leakage is present and which further provides advantages as described below.

In an aspect the disclosure relates to a method of detecting a leakage in a hydrogen refueling station comprising a plurality of hydrogen storage tanks, said method comprising the steps of: establishing at a first time a first representation of at least one fluid parameter associated with hydrogen for at least one of said plurality of hydrogen storage tanks; establishing at a second time a second representation of said at least one fluid parameter for said at least one of said plurality of hydrogen storage tanks; determining a relative difference between said first and second representation of said at least one fluid parameter; for said at least one hydrogen storage tank comparing said relative difference with a threshold difference to detect a leakage in said at least one hydrogen storage tank.

By a hydrogen refueling station is understood a piece of infrastructure arranged for filling vehicles with hydrogen fuel in the form of pressurized hydrogen. The hydrogen refueling station may be a part of a station for fossil fuel refueling or it may be an independent station. The hydrogen refueling station may comprise a production unit, such as an electrolyser unit, which enables the hydrogen refueling station to produce hydrogen locally. Alternatively, hydrogen may be supplied to the hydrogen refueling station from external sources such as a truck trailer.

By the term "hydrogen storage tank" is understood a tank, vessel or container configured for storing hydrogen.

In order to meet customer demands, i.e. multiple refueling in a single day and/or simultaneous refueling of two or more vehicles, hydrogen is stored in one or more hydrogen storage tanks, such as a plurality of hydrogen storage tanks, at high pressures. By storing hydrogen at high pressures it is possible to store large quantities of hydrogen in a compact volume, and furthermore, the high pressure is of great benefit to the hydrogen refueling process where the large pressure difference between the hydrogen storage tank of the refueling station and an empty tank of a vehicle can be used to force hydrogen into the vehicle tank until the two pressures are at equilibrium. Merely using the pressure difference between the hydrogen storage tank and a vehicles tank to refuel the vehicle with hydrogen is commonly known as a cascade refueling. By cascade refueling it is possible to refuel a vehicle until an equilibrium in pressure is reached between a hydrogen storage tank and the vehicle tank. If a greater refueling pressure is needed than what is possible through cascade refueling, the hydrogen refueling station may use one or more compressors to further increase the pressure of the hydrogen dispensed from the hydrogen storage tanks. This refueling process including the use of a compressor is commonly known as direct fill.

Hydrogen is highly flammable and therefore storing large quantities of hydrogen at high pressures is accompanied with safety concerns such as the issue of leakage of hydrogen from hydrogen storage tanks. When hydrogen is leaking from a hydrogen storage tank there is a risk of an explosion occurring as only a small spark or electrical disturbance needs to be present for the leaked hydrogen to ignite. In the case of great leaks of hydrogen, a large cloud of hydrogen gas may form in proximity of the hydrogen storage tank, which when ignited can cause an explosion. In the worst-case scenario, the hydrogen storage tank itself may also explode, which may cause severe damage to the hydrogen refueling station and its surroundings. For this reason, it is particularly advantageous to detect if a hydrogen storage tank is leaking.

If a leakage is detected an operator and/or a user of the hydrogen refueling station may be appropriately warned about the level of danger. Furthermore, the hydrogen refueling station may also cease its operation in response to a detected leakage.

A leakage in a hydrogen storage tank may be detectable by a change in one at least one fluid parameter associated with the hydrogen stored in the hydrogen storage tank, such as two or more fluid parameters associated with the hydrogen stored in the hydrogen storage tank. Such fluid parameters may comprise pressure, temperature, density and any other physical/chemical parameters from which the before-mentioned parameters may be derived from. Said at least one fluid parameter associated with stored hydrogen may be directly established or indirectly established through establishment of a fluid parameter associated with the immediate surroundings of the hydrogen storage tank. For example, the ambient air temperature at the location of the hydrogen storage tank may affect the temperature of the stored hydrogen gas, and an increase in ambient air temperature, due to e.g. changing weather conditions, may result in an increase in the temperature of the stored hydrogen.

A leakage in a hydrogen storage tank may be detectable as a decrease in hydrogen pressure over time. However, a decrease in hydrogen pressure may not unambiguously be associated with a leakage since changes in the temperature of hydrogen also affect the hydrogen pressure. When the temperature of the hydrogen increases so does the pressure of the hydrogen, if no significant leakage of hydrogen is present, and likewise when the temperature of the hydrogen decreases so does the pressure of the hydrogen. Thus, when relying on the pressure in the hydrogen storage tanks in order to determine the presence of a leakage, a reference to the temperature of the hydrogen or the ambient temperature may be needed. For example, if a sudden drop in pressure is detected this may be indicative of a leakage unless a corresponding, and sudden, drop in temperature is also observed.

The method of detecting a leakage in a hydrogen refueling station may be limited to establishing the at least one fluid parameter in only a subset of the plurality of hydrogen storage tanks of the hydrogen refueling station, such as a subset comprising one or more hydrogen storage tanks of said plurality of hydrogen storage tanks. This is advantageous in situations where hydrogen storage tanks are under maintenance, are temporarily settling after refueling with hydrogen, or when the total storage capacity of the plurality of hydrogen storage tanks exceeds user demands in which case one or more of the hydrogen storage tanks are deliberately taken out of operation.

By a representation of a fluid parameter may be understood any presentation of the fluid parameter. An example of such is pressure which may be presented in units of bar, atmosphere, pascal, psi, etc. Further, by representation may also be understood any parameter(s), from which the at least one fluid parameter is derivable from.

The above method is advantageous in that it allows for monitoring and detection of a leakage in one or more hydrogen storage tanks of a hydrogen refueling station. Furthermore, the above method is advantageous in that it allows for continuous monitoring and detection of a leakage.

In an embodiment, each step of establishing said at least one fluid parameter comprises establishing said at least one fluid parameter for each of said plurality of hydrogen storage tanks.

Establishing said at least one fluid parameter in each of said plurality of hydrogen storage tanks is advantageous in that it allows for detection of a leakage in each of said plurality of hydrogen storage tanks. This is particularly advantageous when all hydrogen storage tanks of the hydrogen refueling station are in use.

In an embodiment of the disclosure, said at least one fluid parameter is different among at least two of said plurality of hydrogen storage tanks. This is advantageous in that the method of detection a leakage may be utilized in an already existing hydrogen refueling station where the different hydrogen storage tanks are equipped with different sensors. As an example, only a few of the hydrogen storage tanks may be equipped with both pressure and temperature sensors, with the remaining hydrogen storage tanks only being quipped with pressure sensors. In this sense the established fluid parameter may be density for some of the hydrogen storage tanks while for others it may be pressure. By e.g. making use of temperature measurements from an ambient temperature sensor it is possible to further approximate the density of the hydrogen within hydrogen storage tanks that are only equipped with pressure sensors.

In an embodiment, said step of determining a relative difference between said first and second representation of said at least one fluid parameter comprises determining said relative difference between said first and second representation of said at least one fluid parameter for each of said plurality of hydrogen storage tanks.

Determining said relative difference between said first and second representation of said at least one fluid parameter for each of said plurality of hydrogen storage tanks is advantageous in that it then becomes possible to detect the presence of a leakage in all of the hydrogen storage tanks of the hydrogen refueling station In an embodiment, said step of comparing said relative difference with a threshold difference to detect a leakage comprises comparing said relative difference with said threshold difference for each of said plurality of hydrogen storage tanks.

Comparing said relative difference with said threshold difference for each of said plurality of hydrogen storage tanks is advantageous in that a leakage may be detected for each of the hydrogen storage tanks of the hydrogen refueling station.

In an embodiment, said first time and said second time are separated in time by at least one predetermined time period.

By a predetermined time period is understood a predetermined time duration, such as in the range of 1 to 30 minutes, such as in the range of 5 to 25 minutes, such as in the range of 10 to 20 minutes, for example 15 min. As an example, the first time may be at 13:45 PM and the second time may be at 14:00 PM given a separation in time by a predetermined time period of 15 min. Separating said first and second time by at least one predetermined time period is advantageous since the threshold difference may be applicable for a predetermined time period. As an example, it may be decided that the threshold difference is a given value, such as 0.5 percent, for a predetermined time period, such as 30 minutes. When a threshold difference is applicable for a certain time period, it is thus advantageous to establish said at least one fluid parameter at a first and second time separated in time by a similar time period in order to establish if a leakage is present.

In an embodiment, said first time and said second time are separated in time by a plurality of predetermined time periods.

In this sense, a predetermined time period may be viewed as a common time divider. For example, said first and second time may be separated in time by one hour, and with a predetermined time period of e.g. 15 minutes, that separation in time of one hour constitutes four predetermined time periods. Separating said first and second time by a plurality of predetermined time periods is advantageous in that it allows for continuous monitoring of a hydrogen storage tank.

In an advantageous embodiment of the disclosure, establishments of said at least one fluid parameter is performed on a recurring basis, such that multiple establishments or measurements of said at least one fluid parameter are performed over time. As an example, the at least one fluid parameter may be established/measured any number of times each day, such as between 80 and 120 times per day.

In an embodiment of the disclosure, said method of detecting a leakage is further supplemented by continuous measurements of said at least one fluid parameter. This is advantageous in that large, and suddenly occurring leakages, may also be detected within said predetermined time period.

For example, if the predetermined time period is 15 minutes, said at least one fluid parameter may be established every 15 minutes, and a relative difference may be determined on the basis of two neighboring establishments of said at least one fluid parameter, i.e. two establishments separated in time by 15 minutes. However, the relative difference may also be determined on the basis of two establishments of said at least one fluid parameter that are separated in time by e.g. 30 minutes or one hour, i.e. separated in time by two and four predetermined time periods respectively. In this sense the determination of the relative difference may be based on two establishments of said at least one fluid parameter that are not subsequent establishments in time but separated by one or more other establishments of said at least one fluid parameter.

In an embodiment, said steps of establishing a representation of said at least one fluid parameter is repeated with a frequency given by said predetermined time period.

By establishing a representation of said at least one fluid parameter continuously by fixed time intervals given by the predetermined time period is advantageous in that the method allows for continuous leakage detection of the hydrogen storage tanks.

In an embodiment, said representation of at least one fluid parameter is said at least one fluid parameter itself.

A fluid parameter may be established on the basis of measurements of physical and/or chemical parameters. As an example, temperature can be measured by a temperature sensor, such as a PT100 temperature sensor. A PT100 sensor relies on a specific relationship between temperature and electrical resistance, and by measuring the temperature dependent electrical resistance of a platinum element it is possible to infer the temperature. In this sense, a measurement of the electrical resistance may be taken as a representation of temperature because the temperature may be directly derivable from this measurement. Thus, in an embodiment of the disclosure, the representation of the fluid parameter, e.g. electrical resistance, may not be the fluid parameter itself. However, if a conversion is made, such as a conversion into temperature from electrical resistance, the representation of the fluid parameter is the fluid parameter itself.

In an embodiment, said steps of establishing said first and second representation of said at least one fluid parameter comprises measuring said at least one fluid parameter.

By measuring said at least one fluid parameter is understood performing a measurement directly or indirectly on the stored hydrogen in order to establish said at least one fluid parameter.

In an embodiment, said at least one fluid parameter is pressure.

Measuring the pressure of hydrogen in a hydrogen storage tank is advantageous in that it allows for detecting a leakage under certain circumstances. When a pressurized tank leaks, the amount of hydrogen contained within the tank decreases resulting in a reduction in pressure within the storage tank. Thus, a decrease in measured pressure, which is not attributed to an intended refueling of a vehicle, may be an indicator of a leakage. However, a decrease in pressure may also be due to a decrease in gas temperature since the density of a gas, which must be constant for a non-leaking tank, is proportional to temperature over pressure. If, however, the pressure is measured in more than one hydrogen storage tank and similar relative drops in pressure is detected in these, then that is an indication of a decrease in gas temperature instead of a leakage in a hydrogen storage tank.

In an embodiment, said pressure is measured using a pressure sensor connected to said at least one of said plurality of hydrogen storage tanks.

By connected is understood that a pressure sensor may be located on or in the hydrogen storage tank, or alternatively in immediate fluid connection with the hydrogen storage tank. As an example, a pressure sensor may be located in, or on, piping adjacent to, and in fluid connection with, a hydrogen storage tank.

In an embodiment, said pressure is measured for each of said plurality of hydrogen storage tanks using a plurality of pressure sensors, each pressure sensor connected to a respective hydrogen storage tank.

In an embodiment, said at least one fluid parameter comprises temperature.

Measuring the temperature of the hydrogen stored in the hydrogen storage tanks is advantageous when also simultaneously measuring the pressure since it then becomes possible to check whether a change in pressure may be correlated with a change in temperature. Furthermore, measuring the temperature and pressure is advantageous in that it allows for determining a density of the hydrogen.

In an embodiment, said temperature is an ambient temperature measured by at least one temperature sensor positioned externally from said plurality of hydrogen storage tanks.

By measuring the ambient temperature of the hydrogen refueling station by the use of a temperature sensor positioned externally from the hydrogen storage tanks, it is possible to establish, or at least approximate, the temperature within the plurality of hydrogen tanks. Measuring the ambient temperature using a single temperature sensor positioned externally from the plurality of hydrogen storage tanks is advantageous with regards to the cost of manufacturing of the hydrogen refueling station because it is cheaper to utilize a single temperature sensor than equipping each of the hydrogen storage tanks with its own dedicated temperature sensor. Furthermore, making use of an ambient temperature sensor is advantageous in that many pre-existing hydrogen refueling stations may only have pressure sensors mounted on the individual hydrogen storage tanks but not also temperature sensors on the tanks. Therefore, the method may be applicable to already existing hydrogen refueling stations without the need of further modifications like installation of additional temperature sensors.

In an embodiment, said temperature is measured for each of said plurality of hydrogen storage tanks using a plurality of temperature sensors, each temperature sensor connected to a respective hydrogen storage tank of said plurality of hydrogen storage tanks.

By connected is understood that a temperature sensor may be located on or in the hydrogen storage tank, or alternatively in immediate fluid connection with the hydrogen storage tank. As an example, an individual temperature sensor may be located in, or on, piping adjacent to, and in fluid connection with, its corresponding hydrogen storage tank.

The temperature sensor(s) may be of the sensor type PT100.

Measuring the temperature of hydrogen for each of said plurality of hydrogen storage tanks using a plurality of temperature sensors, each temperature sensor connected to a respective hydrogen storage tank, is advantageous in that the conditions of the stored hydrogen, in each hydrogen storage tank, are better accounted for. For example, when also measuring the pressure of hydrogen in each of the hydrogen storage tanks it becomes possible to also determine the density of hydrogen in each of the hydrogen storage tanks.

In an embodiment, said at least one fluid parameter comprises density.

Establishing the density of hydrogen within a tank is advantageous in that the density of hydrogen within a tank is independent of a change in temperature, and thus a decrease in density may unambiguously be attributed to a leakage, and not merely due to a change in temperature. In this sense the density of hydrogen may directly account for the quantity of hydrogen stored in a hydrogen storage tank.

In an embodiment, said density is established on the basis of measurements of pressure and temperature.

By a simultaneous measurement of both the temperature and pressure it is possible to also determine the density of the stored hydrogen. Measuring the density of hydrogen on the basis of measurements of temperature and pressure is advantageous in that means for measuring temperature and pressure may already be present in the hydrogen refueling station, for other purposes than determining hydrogen density, and thus no additional dedicated sensor may be needed for carrying out the method.

In an embodiment, said establishing said density on the basis of measurements of pressure and temperature comprises determining a density value with reference to an already pre-determined density value.

By determining a density value with reference to an already pre-determined density value is advantageous in that a calculation of the hydrogen density in a hydrogen storage tank may be avoided. The pre-determined density value may be an already measured density value for a given temperature and pressure or an already calculated density value for the given temperature and pressure. As an example, it may already have been determined on the basis of calculations that the density of a hydrogen at a pressure of 500 bar and at 23 degree Celsius is 30.973 kg per meter cubed, and this calculated density may be used as the appropriate density value for the hydrogen storage tank when it is established that the pressure in the tank is 500 bar and the temperature is 23 degree Celsius. By pre-calculating/measuring the density of hydrogen for selected ranges of temperature and pressure it is possible to generate a list of densities which may be referred to for the determining of the hydrogen density in the hydrogen storage tank.

In an embodiment, said establishing said density on the basis of measurements of pressure and temperature comprises determining a density value with reference to a table of density values.

The above described map of densities may be stored in a table. As an example, the National Institute of Standards and Technology, abbreviated "NIST", has advanced models of hydrogen density as a function of temperature and pressure. By knowing the value of pressure and value of temperature and correlating these values with corresponding values of pressure and temperature, already present in a table, it is possible to infer a corresponding density. If such a correlation is not possible due to a limited number of datapoints in the table, an interpolation of the density may be made. Such an interpolation may be a linear interpolation between density values on a table for two sets of temperature and pressure that are closest to the value of pressure and value of temperature in the hydrogen storage tank.

In an embodiment, each of said hydrogen storage tanks store hydrogen gas at a pressure in the range from 20 bar to 1000 bar.

The hydrogen storage tanks may store hydrogen at pressures in the range of 20 bar to 1200 bar, such as in the range of 20 bar to 1000 bar, such as in the range from 20 bar to 950 bar, such as in the range of 200 bar to 800 bar, for example in the range of 200 bar to 500 bar, e.g. 500 bar. These pressures are understood as high pressures.

In an embodiment, said threshold difference is a first threshold difference.

The first threshold difference may be used for detection of a small leakage, such as a leakage given by a decrease in hydrogen density exceeding 0.5 percent over 30 minutes. Such a small detected leakage may be an indication of an actual small leakage in a hydrogen storage tank, be due to an instrumental error or due to extraordinary conditions such as sudden changes in temperature. In the case of a small leakage, the danger of being in proximity of the hydrogen refueling station is small, and operation of the station may continue without the user of the station noticing anything. An operator of the hydrogen refueling station may receive a warning of a small leakage such that he/she may continue to monitor the hydrogen refueling station, and in particular monitor the evolution of the detected leakage over time.

In an embodiment, said step of comparing said relative difference with a threshold difference comprises comparing said relative difference with a second threshold difference to detect a leakage.

The second threshold difference may be used for detection of a leakage greater than a leakage characterized by a relative difference exceeding said first threshold difference and not said second threshold difference, such as a leakage given by a decrease in hydrogen density exceeding 1 percent over an hour, which may constitute a severe danger to surrounding people. Using a second threshold difference different from said first threshold difference is advantageous in that the appropriate response to a detected leakage may be better matched with the severity of the leakage. For example, an operator of the hydrogen refueling station may receive a warning when a first threshold difference is exceeded whereas an alarm may be initiated when said second threshold difference is exceeded, since a leakage characterized by a relative difference exceeding said second threshold difference constitutes a more dangerous leakage. In an embodiment of the disclosure, the operation of the hydrogen refueling station is aborted in response to the detection of such a such a leakage.

In an embodiment of the disclosure, said second threshold difference is greater than said first threshold difference.

In an embodiment of the disclosure, said second threshold difference is smaller than said first threshold difference.

The magnitude of the second threshold difference in relation to the first threshold difference depends on the way the relative difference is calculated, i.e. if it is the ratio of the first representation of said at least one fluid parameter to the second representation of said at least one fluid parameter, or the inverse ratio.

In an embodiment, said threshold difference is applicable for a time period defined by one or more predetermined time periods.

A threshold difference represents an acceptable limit to a relative difference in an established representation of a fluid parameter, e.g. an acceptable limit to a measured pressure change or an acceptable limit to a determined density change. The timing of such changes is of importance to the determining of a leakage. If a large relative difference is determined over a short time period, it is a greater indication of a large leakage, than if the same relative difference is determined over a longer time period.

In an embodiment said threshold difference is 0.5 percent over a 30 min time period. As an example, a warning level may be reached when the density of the hydrogen in one or more hydrogen storage tanks has decreased by 0.5 percent over a 30 min time period.

In an embodiment said threshold difference is 1 percent over a one-hour time period. As an example, an alarm level may be reached when the density of the hydrogen in one or more hydrogen storage tanks has decreased by 1 percent over a one-hour time period.

In an embodiment, said threshold difference is a predetermined threshold difference value.

Using a predetermined threshold difference value is advantageous in that no calculations of a threshold difference is needed during operation of the hydrogen refueling station. Based on the specifications of a hydrogen storage tank it may be possible already during planning and/or commissioning of the hydrogen refueling station to determine a threshold difference, such as a first and second threshold difference.

In an embodiment of the disclosure, said threshold difference is predetermined on the basis of a volume of said at least one hydrogen storage tank and a leak rate.

In an embodiment of the disclosure, said first and second threshold differences are determined on the basis of a volume of said at least one hydrogen storage tank and a leak rate.

Basing said predetermined threshold difference on a volume of said at least one hydrogen storage tank and a leak rate is advantageous in that it may be possible to determine a threshold difference which is based on conditions which a manufacturer of a hydrogen storage tank believes constitutes a leakage worth triggering an alarm/warning, i.e. a manufacturer may specify that an alarm or warning is to be triggered when a certain leak rate (i.e. a leakage of hydrogen given in units of kg per seconds) is reached for a given hydrogen storage tank having a specific volume.

The threshold difference(s) may for example be calculated using a formula which takes at least a volume of a hydrogen storage tank as input. Such a formula may further take a pre-defined leak rate as input. The pre-determined leak-rate may be specified by a manufacturer of the hydrogen storage tank.

By determining the threshold difference on the basis of the volume of said at least one hydrogen storage tank is further advantageous in that the threshold difference may be adapted to a current configuration of the hydrogen refueling station. As an example, the hydrogen storage capacity of the hydrogen refueling station may be upgraded over time by e.g. replacing hydrogen storage tanks with larger capacity hydrogen storage tanks. Thus, by determining the threshold difference on the basis of the volumes of the hydrogen storage tanks, it is possible to adjust the threshold differences in response to changes in the configuration of the hydrogen refueling station, e.g. changes to the volumes of the hydrogen storage tanks.

In an embodiment, each of said relative differences is compared to a corresponding predetermined threshold difference.

The threshold difference may be unique for each hydrogen storage tank depending on its specifications, such as volume, rated pressure level, and its material and/or vessel type. Thus, a different predetermined threshold difference may exist for each of said plurality of hydrogen storage tanks.

In an embodiment, said threshold difference is in the range of 0.1 to 2 percent.

In an embodiment of the disclosure said threshold difference is in the range of 0.1 to 2 percent, such as in the range of 0.5 to 1 percent, for example 0.5 percent or 1 percent.

In an embodiment, a leakage is detected when at least one relative difference is outside a range of acceptable values of relative difference, said range being limited in at least one end by said threshold difference.

In an embodiment, said threshold difference is a lower limit to said range of acceptable values of relative difference.

In an embodiment, said threshold difference is an upper limit to said range of acceptable values of relative difference.

In an embodiment, said hydrogen refueling station is arranged to operate in a dispensing mode and a shutdown mode.

By a dispensing mode is understood a mode of operation where the hydrogen refueling station is capable of refilling vehicles with hydrogen. This is also the normal mode of operation of the hydrogen refueling station. By a shutdown mode is understood a mode of operation in which the hydrogen refueling station has suspended normal operation and is no longer capable of dispensing hydrogen to any vehicles. Such a mode of operation may be necessary when a large leakage of hydrogen is detected in one or more of the hydrogen storage tanks. The switching from dispensing mode to shutdown mode may be performed on the basis of a detected leakage and may further be performed automatically by the hydrogen refueling station itself.

In an embodiment, a warning signal is initiated in response to a detected leakage.

Initiating a warning signal in response to a detected leakage is advantageous in that relevant persons may be made aware of a problem or danger. As an example, an operator of the hydrogen refueling station may receive a warning signal, such as a warning by short message service (SMS), E-mail or a warning through dedicated control/monitoring software used by the operator. The warning signal may state the location of the hydrogen storage tank where a leakage has been detected and the severity of the leakage. By continuously monitoring the hydrogen storage tank, the operator may determine whether it is an instrumental error (i.e. sensor fault) or an abnormality due to e.g. rapidly changing weather conditions, or if in fact it is an actual leakage from the hydrogen storage tank. A warning signal may for example be initiated when a relative difference of a hydrogen storage tank surpasses the first threshold difference.

In an embodiment, said warning signal comprises an alarm signal.

Initiating a warning signal in the form of an alarm signal, such as a visual or acoustical alarm signal, is advantageous in that users of the hydrogen refueling station, or other nearby people, may be alerted when a large leakage of hydrogen is detected.

The warning signal may for example be initiated when a relative difference of a hydrogen storage tank surpasses the second threshold difference.

In an embodiment, said hydrogen refueling station is arranged to switch from dispensing mode to shutdown mode in response to a detected leakage.

In particular, the switching from dispensing mode to shutdown mode may be done when a determined relative difference surpasses the second threshold difference.

In an embodiment, said steps of establishing a representation of a least one fluid parameter are performed following an expiration of a settling time.

In an embodiment, said settling time is in the range of 1 to 20 minutes.

After filling or emptying a hydrogen storage tank, the stored hydrogen undergoes a process of reaching thermodynamic equilibrium and this process takes some time, i.e. a settling time. Measurements of pressure and temperature of the hydrogen gas within the settling time after refilling/emptying therefore does not represent trustworthy measurements of hydrogen equilibrium conditions in the tank and detection of a leakage is hampered in this time period. For this reason, it is advantageous to perform measurement after the settling time has expired. The settling time may be in the range of 1 to 20 minutes, such as in the range of 5 to 15 minutes, for example 10 minutes. Alternatively, the settling time may be less than 5 minutes, such as 1 minutes, or less than 1 minutes, such as half a minute.

In an embodiment, said method further comprises receiving said measurements, in the form of sensor data, of said at least one fluid parameter in a memory associated with a controller, such as a programmable logic controller, via a data communication link.

By a controller is understood a microcontroller, computer, PLC controller or programmable logic controller, electromechanical controller or any other type of controlling unit comprising a processor.

In an embodiment, said step of determining a relative difference between said first and second measurement of said at least one fluid parameter is carried out by said controller.

By a data communication link is understood a wired or wireless connection between a sensor, such as a pressure sensor and/or a temperature sensor and said controller. Examples of wireless connections may be Wi-Fi, Bluetooth, and Zigbee connections. The data communication link is arranged to transfer sensor data comprising said representations of said at least one fluid parameter from said sensor to said controller. The sensor data may be stored in a memory associated with said controller. By a memory is understood any device capable of storing data, like a hard drive, solid state drive, compact disk-read-only memory (CD-ROM), DVD, Blu-Ray, or some form of removable storage device. Receiving said measurements, in the form of sensor data, in a memory associated with said controller is advantageous in that measurements may be stored and used for later use by the processor of the controller to e.g. determine relative differences.

In an embodiment, said step of comparing said relative difference with said threshold difference to detect a leakage in said at least one hydrogen storage tank is carried out by said controller.

In an embodiment, said controller is comprised by said hydrogen refueling station.

In an embodiment said sensor data is received in said memory via a wireless data communication link.

In an embodiment said predetermined threshold difference is stored in said memory associated with said controller. The memory may also be arranged to store said first and second threshold differences. This is advantageous in that the controller may thereby be able to compare a relative difference to said first threshold difference and/or said second threshold difference.

In an embodiment, the method of detecting a leakage, wherein the at least one fluid parameter is density and wherein the method furthermore comprises the steps of:
  establishing the density of hydrogen gas in each of a plurality of hydrogen storage tanks,
  compare the established densities, and
  indicate the presence of a leakage if at least one of the established densities deviates from the majority of established densities by a deviation threshold value.

This is advantageous in that it has the effect, that a change of temperature, during a period in which a leakage check is made, can be accounted for and thereby does not influence the evaluation of whether or not a leakage exists.

In an embodiment, a percentage pressure change is established according to the following equation $$\Delta P_\% = (a \cdot T_{init}^2 + b \cdot T_{init} + c) \cdot \Delta T_{abs}$$

This equation is advantageous in that it has the effect, that by applying an initial temperature (e.g. measured at time T1) and a Delta temperature (e.g. difference between measured temperature at T1 and T2) a percentage pressure deviation can be calculated.

In an embodiment, an absolute pressure change is established according to the following equation:

$$\Delta P_{abs} = P_{init} \cdot \Delta P_\%$$

This is advantageous in that it has the effect, that an absolute pressure deviation which can be established as the difference between a measuring of pressure in a hydrogen storage tank at a time T1 and measuring of pressure in the same storage tank at a later time T2. Thereby a controller can an indicate a leakage by using simple math on the result of two subsequent pressure measurement made on the same hydrogen storage tank.

In an embodiment, a leakage is indicated if:

$$\Delta P_{LeakCheck} > \Delta P_{abs} \text{ then: Pressure decrease by leak}$$

wherein $\Delta P_{LeakCheck}$ is the pressure change established based on measurements of pressure of a storage tank at a first time T1 and a second time T2. This is advantageous in that a measured pressure difference between two subsequent pressure measurements can be compared with an expected pressure difference that would occur between the two subsequent pressure measurements, wherein the expected pressure difference is calculated based on information of ambient temperature. The ambient temperature is used in case no temperature of the gas inside the tank is available. This is because the gas temperature in the tank follows the ambient temperature with a delay due to geometry and material of the tank.

In an aspect the disclosure relates to a hydrogen refueling station comprising: a hydrogen storage module comprising a plurality of hydrogen storage tanks; one or more sensors; a hydrogen station module comprising a compressor; a hydrogen dispensing module in fluid connection with said hydrogen storage module, said hydrogen dispensing module comprising at least one hydrogen dispensing nozzle; wherein said hydrogen storage module is fluidly connected to said hydrogen station module by a first fluid connection, wherein said hydrogen station module is fluidly connected to said hydrogen dispensing module through a second fluid connection; and wherein said hydrogen refueling station is controlled by a controller arranged to detect a leakage in said hydrogen refueling station using the method according to any of the previously described embodiments.

In an embodiment said hydrogen refueling station comprises a plurality of hydrogen storage tanks, said plurality of hydrogen storage tanks arranged to store hydrogen at a plurality of values of pressure.

In an embodiment said controller is comprised by said hydrogen refueling station.

In an embodiment said controller is a programmable logic controller.

In an embodiment said controller is a first controller.

In an embodiment said hydrogen refueling station comprises a second controller, such as a second programmable logic controller.

The second controller may be decoupled from the first controller to provide an additional layer of redundancy to the hydrogen refueling station. Having an additional controller is advantageous for reasons of safety. If for example, the first controller, associated with its own set of sensors, does not detect a leakage and the second controller, associated with its own different set of sensors, detects a leakage, the second controller may override the first controller.

In an embodiment said one or more sensors comprise one or more pressure sensors.

In an embodiment each of said plurality of hydrogen storage tanks is connected to a pressure sensor.

By connected is understood that a pressure sensor may be located on or in the hydrogen storage tank, or alternatively in immediate fluid connection with the hydrogen storage tank. As an example, a pressure sensor may be located in, or on, piping adjacent to, and in fluid connection with, a hydrogen storage tank.

In an embodiment said one or more sensors comprise one or more temperature sensors.

In an embodiment, said one or more temperature sensors are connected to said plurality of hydrogen storage tanks such that each hydrogen storage tanks is associated with its own temperature sensor.

By connected is understood that a temperature sensor may be located on or in the hydrogen storage tank, or alternatively in immediate fluid connection with the hydrogen storage tank. As an example, an individual temperature sensor may be located in, or on, piping adjacent to, and in fluid connection with, its corresponding hydrogen storage tank.

The one or more temperature sensors may be of the type PT100 sensors.

In an embodiment said hydrogen refueling station comprises an ambient temperature sensor arranged to measure an ambient temperature of the hydrogen refueling station.

In an embodiment each of said plurality of hydrogen storage tanks is connected to a temperature sensor.

In an embodiment said hydrogen dispensing module comprises two hydrogen dispensing nozzles.

Having two dispensing nozzles is advantageous in that it enables for simultaneous refueling of vehicles.

In an embodiment said hydrogen storage module and said hydrogen station module are physically separated from each other.

In an embodiment said second fluid connection is at least partly disposed underground.

Disposing the second fluid connection at least partly underground is advantageous in that hydrogen flowing from the hydrogen station module to the hydrogen dispensing module is not unnecessarily subjected to weather. For practical reasons, and in order to achieve low refueling times, it is desirable to have the hydrogen at a low temperature during refueling, and therefore heating induced by the sun is best avoided. When a fluid line is submerged in the ground it is not nearly as susceptible to heating from the sun, and the temperature of the soil is generally lower than the temperature over ground which may also change rapidly with changing weather conditions. A further advantage of having the second fluid connection disposed at least partly underground is that the risk of the second fluid line being run over or crashed into by a vehicle is reduced.

In an embodiment said hydrogen refueling station further comprises a cooling unit.

To achieve an acceptable driving range, the hydrogen should be stored at a high pressure in a vehicle tank. This of course, imposes great requirements to the equipment at the station and in the vehicle. Another challenge is during refueling, the hydrogen gas temperature will increase due to two physical phenomena: 1) reverse Joule-Thomson effect during isenthalpic expansion through valves in the refueling system, and 2) heat of compression in the vehicle tank, i.e. as a vehicle tank is filled with hydrogen (either through cascade refueling or refueling using a compressor) the pressure and temperature increases as a function of enthalpy growth. For this reason, it is advantageous to have a cooling unit. By a cooling unit is understood a unit which is arranged to cool (or pre-cool) the hydrogen before it enters the vehicle. Pre-cooling the hydrogen using a cooling unit enables for a fast refueling without running the risk of overheating the vehicle tank.

In an embodiment said cooling unit is arranged in said hydrogen station module.

Arranging said cooling unit in said hydrogen station module is advantageous in that it reduces the complexity of the hydrogen dispensing module The hydrogen refueling station may comprise a plurality of hydrogen storage tanks arranged to store hydrogen at different pressure levels. As an example, a hydrogen refueling station may comprise a first hydrogen storage tank rated at a pressure of 200 bar and a second hydrogen storage tank rated at a pressure of 500 bar. By having hydrogen storage tanks operating at different pressure levels is advantageous in that the hydrogen refueling station may be arranged for refueling, by cascade refueling, in a fast and safe manner since the hydrogen pressure in a vehicle tank may be ramped up in successive steps using hydrogen storage tanks of increasing hydrogen pressure.

In an embodiment, the controller is configured to detect a leakage
- by establishing at least one fluid parameter associated with hydrogen for each of a plurality of hydrogen storage tanks,
- compare the established fluid parameters, and
- indicate the presence of a leakage if at least one of the established fluid parameters deviates from the majority of established fluid parameters by a deviation threshold value.

This is advantageous in that it has the effect, that if a fluid parameter such as density drops due to a drop in ambient temperature, such drop in density will be substantially the same for all of the plurality of hydrogen storages. However, if density of one hydrogen storage tank drops more than the other, then this would indicate a leakage In an embodiment, the deviation threshold value is at least 5%, preferably 3% and most preferably 2%. Having a deviation threshold value between 5% and 1%, such as e.g. 2.% of the deviating fluid parameter, is advantageous in that it has the effect, that leakages are not indicated based on differences in calibration of sensors etc.

In an embodiment, the controller is configured to indicate a leakage by changing at least one output of an I/O module associated with the controller. This is advantageous in that it has the effect, that the hydrogen refueling station can be turned off in case the controller indicates a leakage. Preferably, in addition to changing an output, the controller also communicates to a controller external to the hydrogen refueling station.

In an embodiment, the controller is configured to detect leakage of hydrogen storage tanks between two subsequent vehicle refuelings. This is advantageous in that it has the effect, that the leakage detection is facilitated 24 hours a day.

BRIEF DESCRIPTION OF THE DRAWINGS

Various embodiments of the disclosure will in the following be described with reference to the drawings where.

DETAILED DESCRIPTION

One of the main applications of hydrogen as an energy carrier is its usage in fuel cell vehicles for transport, by replacing the current scenario based on fossil fuels. Thus, hydrogen fuel cell vehicles must be refueled in a hydrogen refueling station HRS, which are analogous to conventional petrol stations for petrol powered vehicles. Similarly, to a conventional petrol station where large amounts of petrol (or diesel) is stored for refueling of internal combustion vehicles, a hydrogen refueling station HRS stores large amounts of hydrogen in one or more hydrogen storage tanks HST under high pressure. In theory, a hydrogen refueling station HRS could make use of a single hydrogen storage tank HST storing hydrogen at an extremely high pressure, such as well above 1000 bars of pressure, to meet customer demands, e.g. a desired number of refueling in a single day. However, for reasons of safety and costs, the hydrogen refueling station HRS may utilize a plurality of hydrogen storage tanks HST storing hydrogen at lower pressures.

Figure 1A:
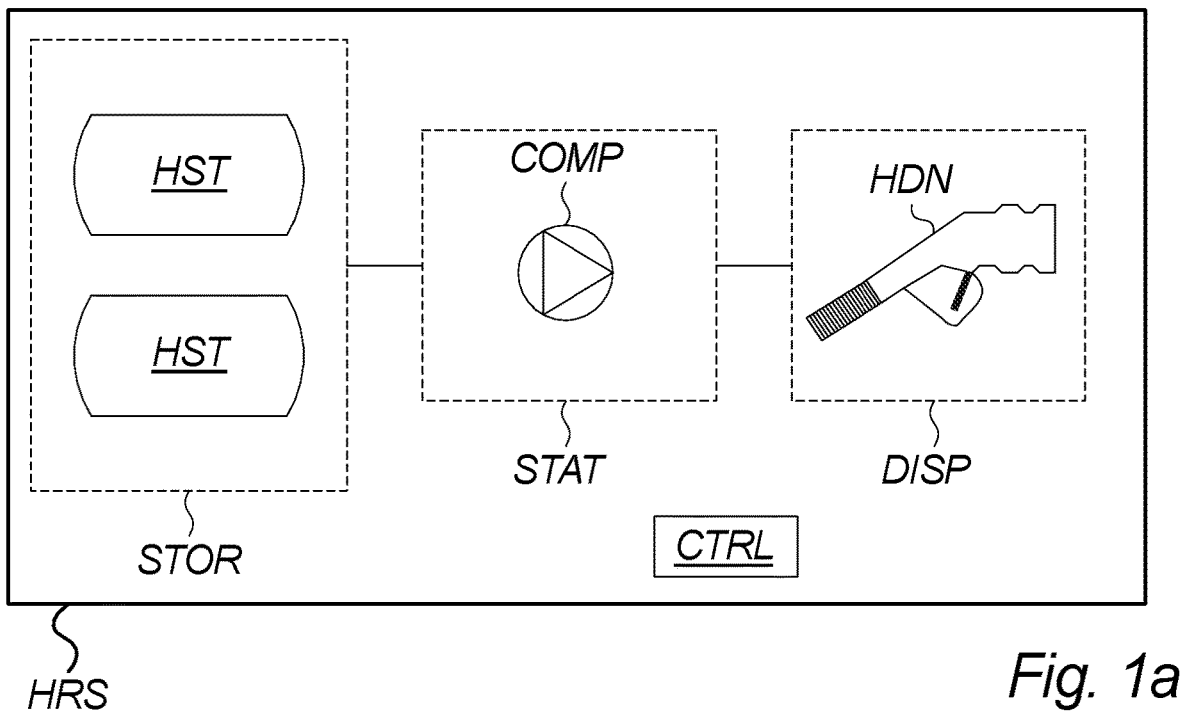
FIGS. 1a-b illustrate a hydrogen refueling station according to embodiments of the disclosure.
Figure 1B:
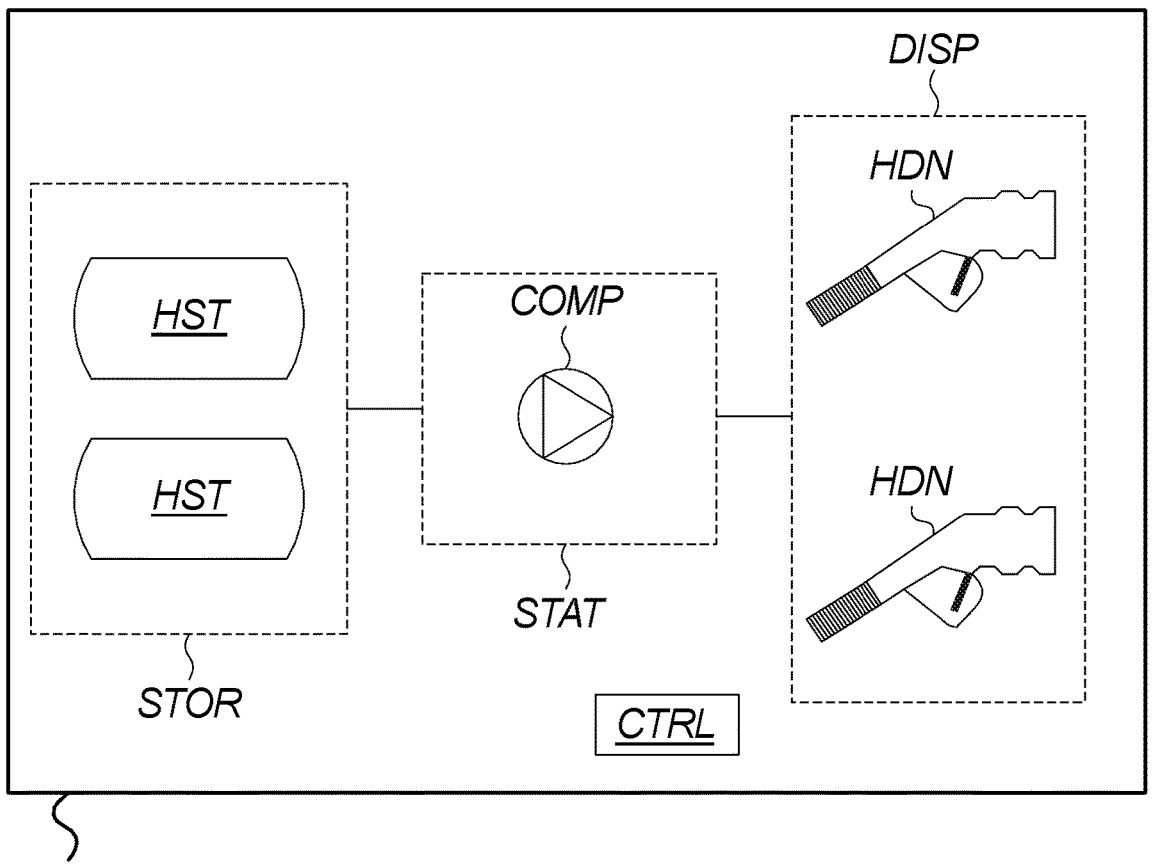

FIG. 1a shows a hydrogen refueling station HRS according to an embodiment of the disclosure. The hydrogen refueling station HRS comprises a hydrogen storage module STOR, a hydrogen station module STAT and a hydrogen dispensing module DISP. The hydrogen storage module STOR of this embodiment comprises two hydrogen storage tanks HST, however in other embodiments of the disclosure the hydrogen storage module STOR may comprise any other number of hydrogen storage tanks HST, such as three or more hydrogen storage tanks HST. The hydrogen storage tanks HST are arranged to store hydrogen at a pressure in the range of 0 bar to 1000 bar. The hydrogen storage module STOR, comprising the hydrogen storage tanks HST, is in fluid connection with the hydrogen station module STAT which comprise at least one compressor arrange to compress stored hydrogen prior to refueling of a hydrogen fuel cell vehicle. As an example, hydrogen may be stored in a hydrogen storage tank HST at a pressure of e.g. 500 bar, and the compressor is thus needed for further increasing the hydrogen pressure if the hydrogen is to be dispensed in a hydrogen fuel cell vehicle at e.g. 750 bars of pressure. The hydrogen dispensing module DISP comprises a hydrogen dispensing nozzle HDN which facilitates a fluid connection between a hydrogen fuel cell vehicle and the hydrogen refueling station HRS. The hydrogen dispensing nozzle HDN of the hydrogen refueling station HRS is thus analogous to a fuel dispenser of a conventional petrol station. FIG. 1b shows a similar embodiment of the disclosure, in which the hydrogen dispensing module DISP comprises two hydrogen dispensing nozzles HDN, and in other embodiments of the disclosure, the hydrogen dispensing module DISP of the hydrogen refueling station HRS comprises a plurality of hydrogen dispensing nozzles such as three or more hydrogen dispensing nozzles. It should be mentioned that with respect to compressor and cooling capacity, it may be preferred to have only 1, 2 or 3 dispensers connected to one station module.

The hydrogen refueling station HRS is operated by a controller CTRL which may control a plurality of valves V (not shown) of the hydrogen refueling station HRS according to external inputs such as pressure and temperature. In the embodiments of FIGS. 1a-b the controller CTRL is shown as being comprised by the hydrogen refueling station, however in other embodiments of the disclosure the controller CTRL may be external from the hydrogen refueling station HRS, and in such situations the controller CTRL may process e.g. sensor readings externally and communicate instructions for valve operation to the hydrogen refueling station HRS via e.g. wireless means of connection, such as Wi-Fi, 3G, 4G-LTE and 5G connections.

Figure 2:
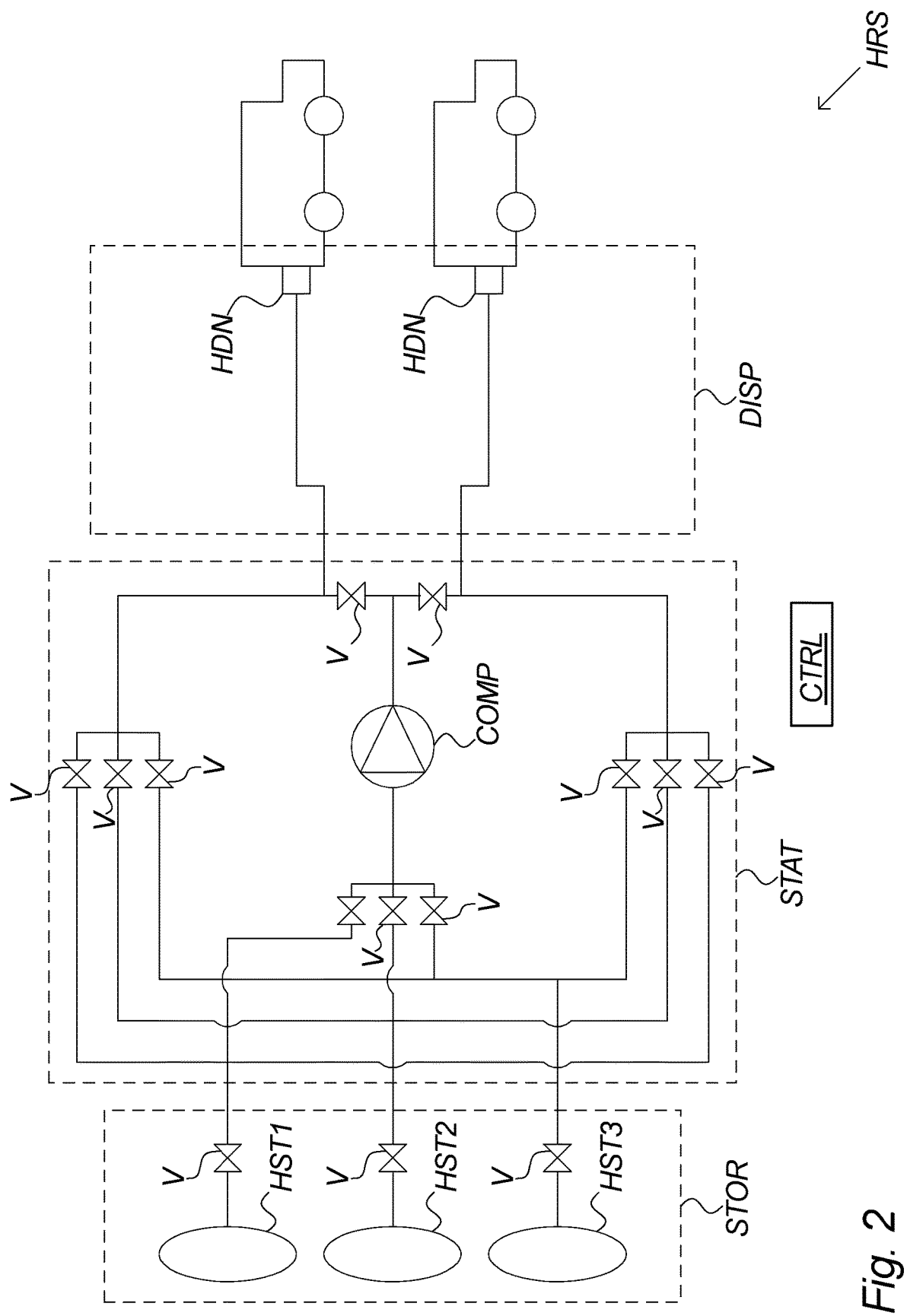
FIG. 2 illustrates a hydrogen refueling station according to embodiments of the disclosure.

FIG. 2 shows a hydrogen refueling station HRS according to an embodiment of the disclosure. The hydrogen refueling station HRS is capable of simultaneously refilling two hydrogen fuel cell vehicles with compressed hydrogen. In this embodiment is shown a simultaneous refilling of two hydrogen fuel cell vehicles using two hydrogen dispensing nozzles HDN, however in other embodiments of the disclosure, the hydrogen refueling station may be arranged to refill any other number of hydrogen fuel cell vehicles, such as a single fuel cell vehicle at a time or three or more fuel cell vehicles simultaneously. The hydrogen storage module STOR of the hydrogen refueling station HRS comprises three hydrogen storage tanks HST1-HST3 which are all in fluid connection with a hydrogen station module STAT comprising a compressor COMP. The compressor COMP is arranged to further compress hydrogen stored in one or more of the hydrogen storage tanks HST1-HST3 in connection with a refilling of a hydrogen fuel cell vehicle.

Parts of the refilling process of a hydrogen fuel cell vehicle may be performed without use of the compressor COMP. When a fuel cell vehicle is about to be refilled, the hydrogen content in the vehicle tank may be so low that the pressure in a hydrogen storage tank HST1-HST3 exceeds the pressure of the vehicle tank. Thus, a pressure difference between a hydrogen storage tank HST1-HST3 and a fuel cell vehicle tank may exist, and this difference in pressure may force hydrogen from a hydrogen storage tank HST1-HST3 to the vehicle tank in parts of the refilling process referred to as a cascade refilling. When the pressure difference diminishes, e.g. an equilibrium in pressure is achieved between a hydrogen storage tank HST1-HST3 and the vehicle tank, and further refilling is needed, the compressor COMP of the hydrogen station module STAT may be used to further compress stored hydrogen which is referred to as pressure consolidation.

Alternatively, the hydrogen storage tanks HST1-HST3 may operate at different pressures such that the cascade refilling is undertaken as a sequence of cascade refueling starting with cascade refueling from one hydrogen storage tank at one pressure and followed by cascade refueling from another hydrogen storage tank at a greater pressure. In this way the hydrogen pressure in the fuel cell vehicle tank may be ramped up in a number of steps through cascade refueling until the greatest possible pressure is achieved. This cascade refueling may be followed by refueling using the compressor if an even greater vehicle tank pressure is needed. The desired path of hydrogen from a hydrogen storage tank HST1-HST3 to the hydrogen fuel cell is ensured by one or more valves V of the hydrogen refueling station HRS. The valves V are controlled by a controller CTRL. As an example, when refueling using different hydrogen storage tanks HST1-HST3, the valve V connecting a hydrogen storage tank HST1-HST3 to the hydrogen station module STAT may be opened to permit flow of hydrogen or closed to block the passage of hydrogen. This is particularly advantageous during cascade refueling where only a few, e.g. only one, hydrogen storage tank is operated at any given time. The valves V may also ensure that the compressor COMP is bypassed during cascade refueling and that the flow of hydrogen is directed through the compressor COMP when higher refueling pressures are needed than what can be achieved through cascade refueling.

Figure 3A:
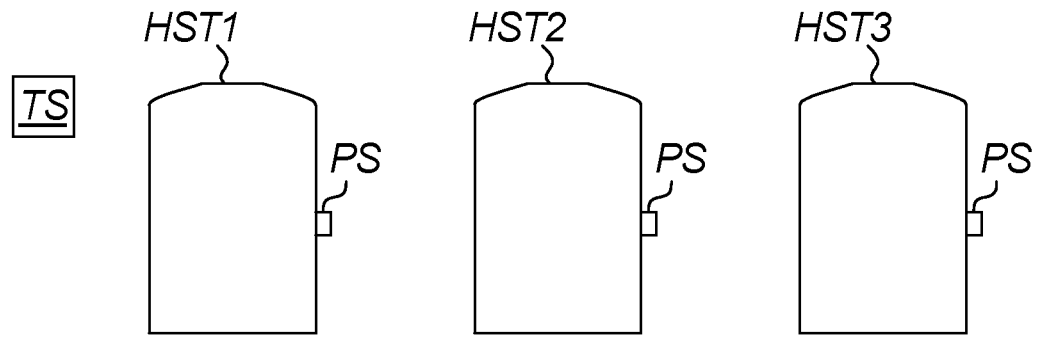
FIGS. 3a-b illustrate hydrogen storage tanks equipped with sensors according to various embodiments of the disclosure.
Figure 3B:
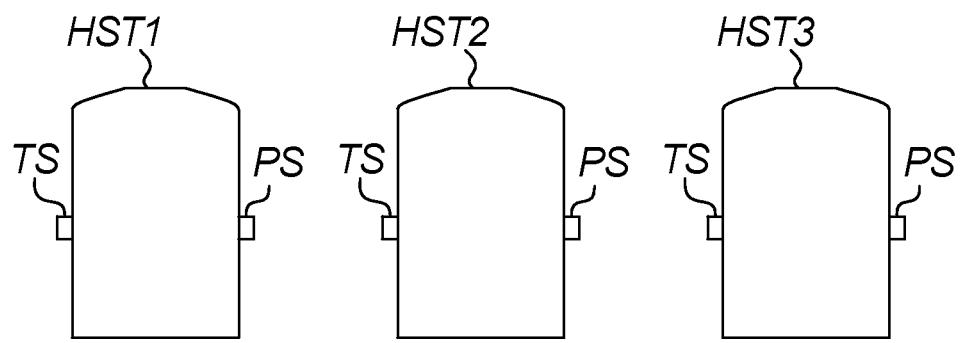

FIGS. 3a-b show embodiments of the disclosure. FIG. 3a illustrates a hydrogen storage module STOR comprising three hydrogen storage tanks HST1-HST3, although any other number of hydrogen storage tanks are conceivable. Each of the hydrogen storage tanks HST1-HST3 are connected with a pressure sensor PS arranged to establish at least a representation of the pressure within its respective hydrogen storage tank HST1-HST3. For purpose of illustration the pressure sensors are positioned on one side of the hydrogen storage tanks, however the pressure sensor may be positioned anywhere on or in the hydrogen storage tank or immediately adjacent to the hydrogen storage tanks, for example in piping connecting the hydrogen storage tank to the hydrogen station module STAT.

In the embodiment of FIG. 3a is shown that in addition to a pressure sensor PS for each of the hydrogen storage tanks HST1-HST3, the hydrogen refueling station HRS may also comprise a temperature sensor TS. The temperature sensor TS may be an ambient temperature sensor which is arranged to establish a representation of the temperature of the surroundings of the of the hydrogen storage tanks HST1-HST3. Under the assumption of thermal equilibrium between the hydrogen stored in the hydrogen storage tanks and the surroundings, a temperature measurement of an ambient temperature sensor may be representative of the temperature of stored hydrogen.

In the embodiment of FIG. 3b is shown that in addition to a pressure sensor PS for each of the hydrogen storage tanks HST1-HST3 comprises a respective temperature sensor TS arranged to establish a representation of the temperature of the hydrogen stored within a hydrogen storage tank. For purpose of illustration the temperature sensors TS are positioned on one side of the hydrogen storage tanks, however the pressure sensor may be positioned anywhere on or in the hydrogen storage tank or immediately adjacent to the hydrogen storage tanks, for example in piping connecting the hydrogen storage tank to the hydrogen station module STAT.

Figure 4:
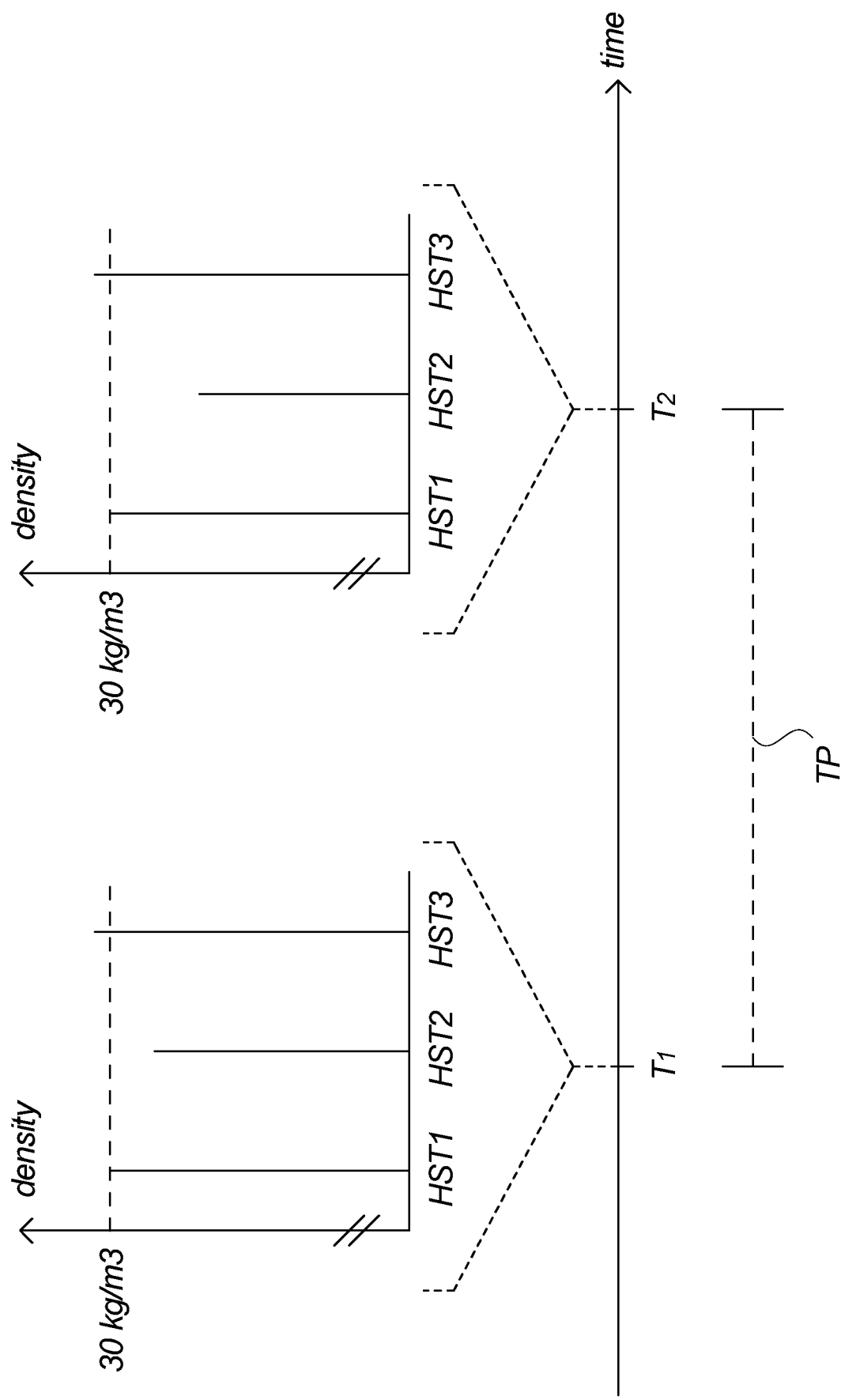
FIG. 4 illustrates a timing of measurements of hydrogen density in hydrogen storage tanks of a hydrogen refueling station according to various embodiments of the disclosure.
Figure 8:
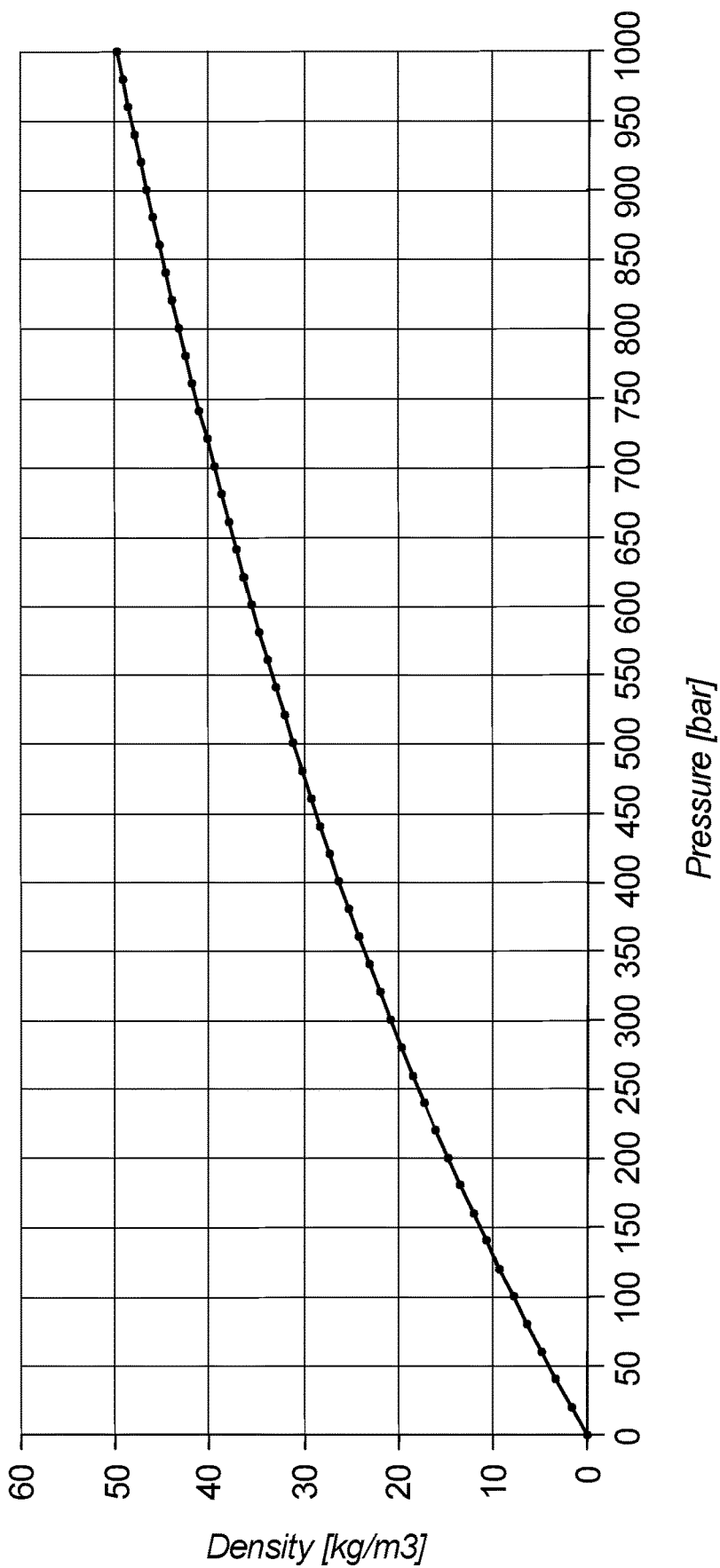
FIG. 8 illustrates an isothermal curve of hydrogen density as a function of hydrogen pressure.

FIG. 4 shows an embodiment of the disclosure. The drawing illustrates a timeline over which a representation of a fluid parameter is established for hydrogen stored in hydrogen storage tanks HST1-HST3 of a hydrogen refueling station HRS. In this embodiment, the fluid parameter is the density of the stored hydrogen. At a first time T1, the density of the hydrogen in the hydrogen storage tanks HST1-HST3 is determined. This determination may be based on measurements of pressure and temperature of the hydrogen, and the determination may be performed by comparing the measurements of temperature and pressure with reference values in a table or graph depicting the density as a function of temperature and pressure. An example of a graph depicting density as a function of pressure is shown in FIG. 8.

In the example of FIG. 4, the density of the hydrogen in the first hydrogen storage tank HST1 is about 30 kg/m3 (kilograms per meter cubed) at the first time T1. Similarly, the density of hydrogen in the second hydrogen storage tank HST2 is lower than 30 kg/m3 (kilograms per meter cubed) and the density in the third hydrogen storage tank HST3 is above 30 kg/m3 (kilograms per meter cubed). At a later second time T2, a representation of the density in the same hydrogen storage tanks HST1-HST3 is established. The second time T2 occurs at the end of a time period TP starting at the first time T1. As seen in the figure, the density of hydrogen remains the same for the first hydrogen storage tank HST1 and the third hydrogen storage tank HST3, whereas the density of hydrogen has decreased in the second hydrogen storage tank HST2 from the first time T1 to the second time T2, and this may be an indication of a leakage in the second hydrogen storage tank HST2. Based on the establishments of density for the hydrogen storage tanks HST1-HST3 at the first time T1 and the second time T2, it is possible to determine a relative difference between density at these times. This relative difference may be determined as the ratio of the density parameter at the second time T2 to the density parameter at the first time T1, or alternatively as the inverse ratio. Thus if the relative difference is determined as the density parameter at the second time T2 divided by the density parameter at the first time T1, the relative difference is a number less than unity (one) for the second hydrogen storage tank HST2 since the density has decreased from the first time T1 to the second time T2. For the first hydrogen storage tank HST1 and the third hydrogen storage tank HST3 the density of hydrogen is not changed substantially (at least as shown in the drawing), and thus the relative difference is substantially one for the hydrogen storage tanks. However due to measurements being prone to errors, the relative difference may of course deviate slightly from one, even for a well-functioning storage tank that is not leaking. If the relative difference is calculated as the inverse ratio, a number greater than unity (one) would be indicative of a leakage. The two different relative differences (calculated as inverse or not) is shown in the FIGS. 5a-b.

FIG. 5a-d show embodiments of the disclosure. The drawings of FIG. 5a-d concern determining if a leakage is present in a hydrogen storage tank based on a comparison of a relative difference RD with a threshold difference TD.

Figure 5A:
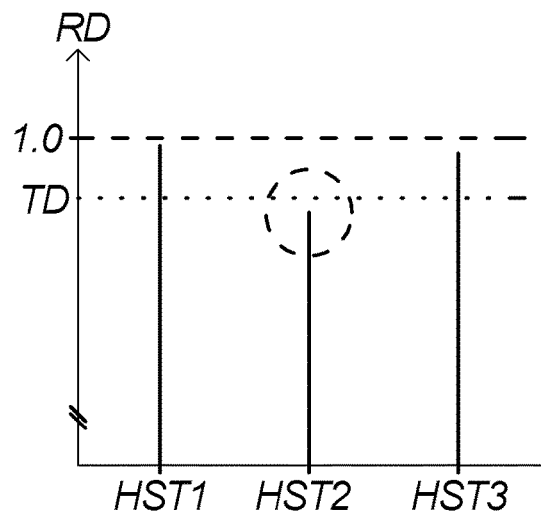
FIGS. 5a-d illustrate steps of comparing a relative difference with a threshold difference according to embodiments of the disclosure.
Figure 5B:
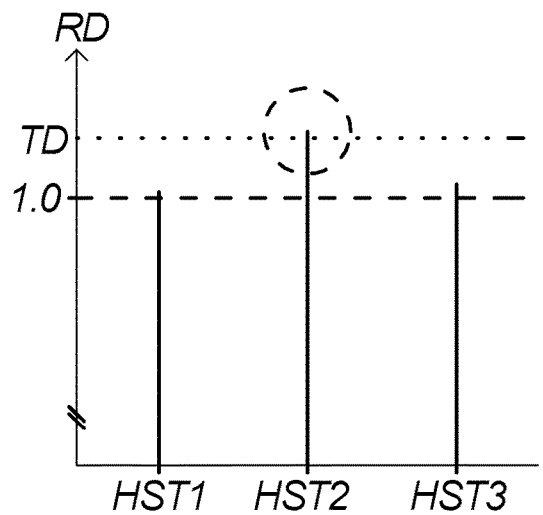

In FIG. 5a is shown the relative difference RD for three hydrogen storage tanks HST1-HST3. As seen, none of the relative differences RD are at unity (one) or above, and these are examples of relative differences that have been calculated as the density of hydrogen at a second time T2 over the density of hydrogen at a first time T1. In this embodiment is shown a predetermined threshold difference TD, which represents a value, i.e. a number, which is a lower limit to acceptable values of relative differences. In this example, the relative difference RD for the second hydrogen storage tank HST2 is below the threshold difference TD, and thus it is determined that a leakage is present in this storage tank (see the encircled area in FIG. 5a). FIG. 5b shows the same situation as in FIG. 5a, however the relative difference RD is calculated inversely and thus the threshold difference TD in FIG. 5b represents an upper limit of acceptable values for the relative differences RD. Thus, the relative difference RD for the second hydrogen storage tank HST2 exceeds the threshold difference TD, and a leakage is thus detected in this hydrogen storage tank (see encircled area in FIG. 5b). In both embodiments of FIG. 5a and FIG. 5b, the relative differences RD for the first hydrogen storage tank HST1 and the third hydrogen storage tank HST3 are within acceptable values of relative difference and thus it is not determined that a leakage is present in any of these hydrogen storage tanks.

Figure 5C:
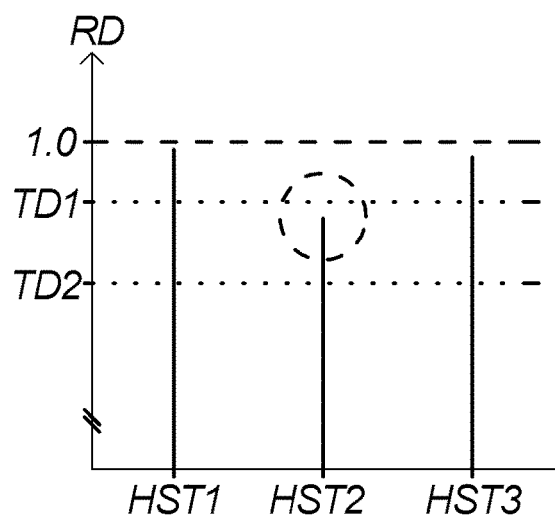

FIG. 5c shows an alternative embodiment to the embodiment of FIG. 5a, in which two threshold differences are present; a first threshold difference TD1 and a second threshold difference TD2.

Figure 5D:
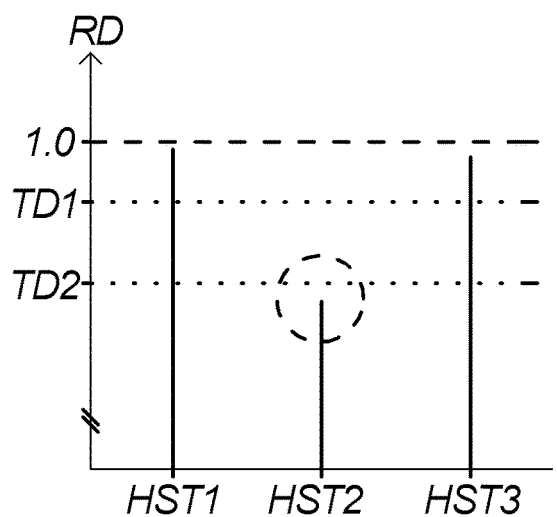

In the example of FIG. 5c the relative difference RD of the second hydrogen storage tank HST2 is below the first threshold difference TD1. This is indicative of a leakage in the second hydrogen storage tank HST2 and a warning may be initiated, e.g. a warning to an operator of the hydrogen refueling station HRS. An operator of the hydrogen refueling station HRS may set the first threshold difference DT1 at a value close to unity, i.e. at a level where concerns of leakage are legitimate and thus when a warning is initiated for a hydrogen storage tank, the operator may have to carefully monitor the development of the relative difference RD of that hydrogen storage tank over time. FIG. 5d shows a later comparison between relative differences RD and the first TD1 and second threshold difference TD2 for the same hydrogen storage tanks HST1-HST3 as referred to in FIG. 5c. As seen, the relative difference RD for the second hydrogen storage tank HST2 has dropped below the second threshold difference TD2, an in response to this an alarm may be initiated. This may be necessary to do since the second threshold difference TD2 in this example is at a value of relative difference RD where the can be no doubt of a leakage, and the leakage may even be a significant leakage which could jeopardize the continued safety of the operation of the hydrogen refueling station HRS. The alarm may be a visual alarm signal and/or an acoustical alarm signal.

Figure 6:
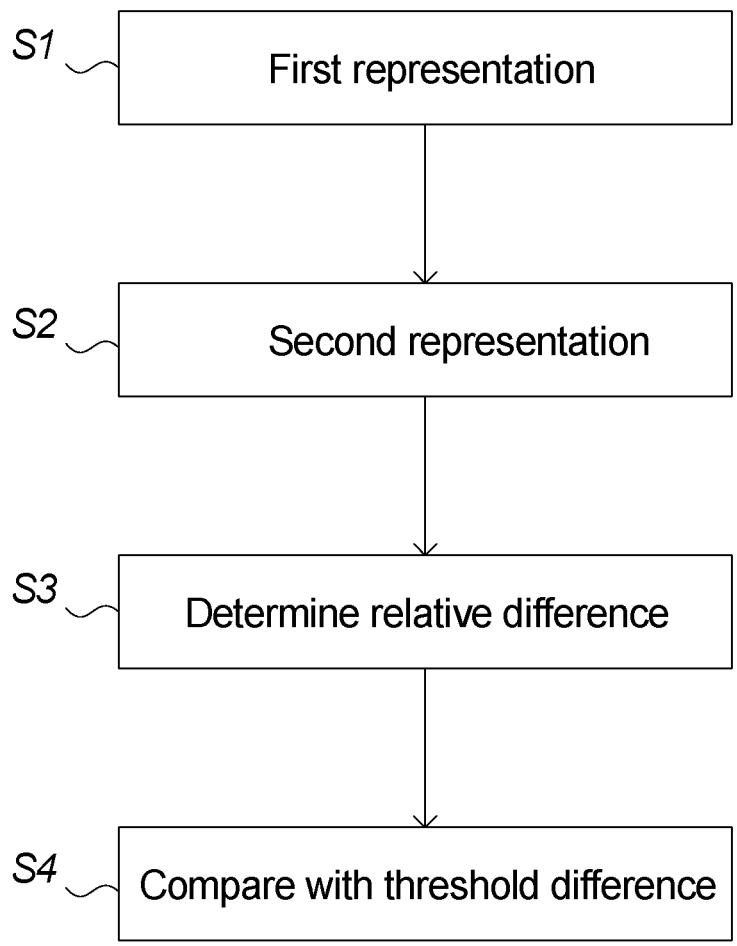
FIG. 6 illustrates steps of a method of detecting a leakage in a hydrogen storage tank of a hydrogen refueling station according to embodiments of the disclosure.

FIG. 6 illustrates an embodiment of the disclosure. The drawing shows steps S1-S4 of a general method of detecting a leakage in a hydrogen refueling station HRS. In a first step S1 is established a first representation of at least one fluid parameter of hydrogen stored in one or more hydrogen storage tanks HST. At a later time, in a second step S2 is established, for the same hydrogen storage tank(s) HST, a second representation of the same at least one fluid parameter. In a third step S3 is determined a relative difference RD on the basis of the first and second representations of the at least one fluid parameter. Lastly, in a fourth step S4, the relative difference RD is compared with a threshold difference TD. Examples of such comparisons are shown in FIGS. 5a-b. The method is repeated in a continuous manner such that the hydrogen refueling station HRS is monitored over time.

Figure 7:
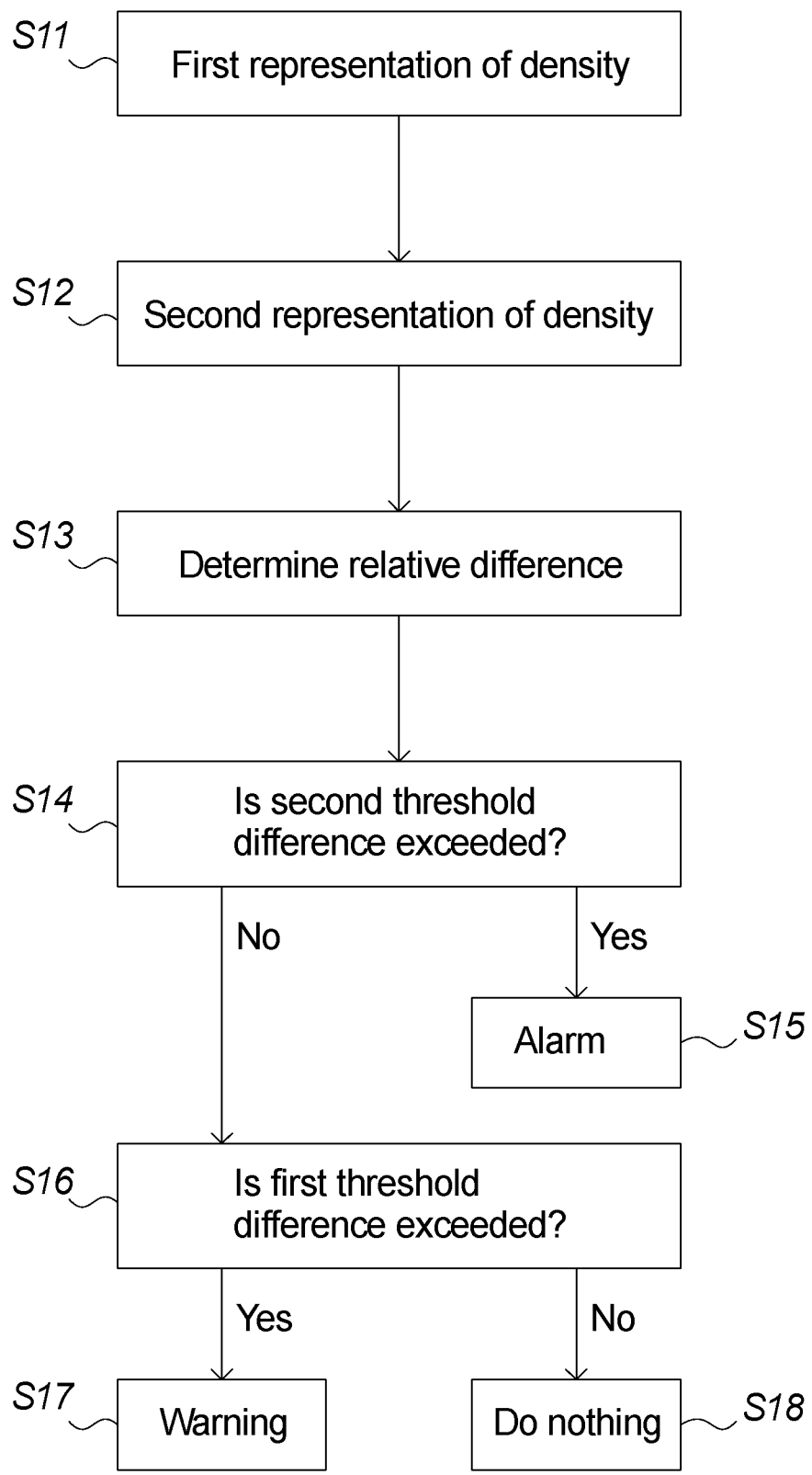
FIG. 7 illustrates steps of a method of detecting a leakage in a hydrogen storage tank of a hydrogen refueling station according to embodiments of the disclosure.

FIG. 7 illustrates an embodiment of the disclosure. The drawing shows steps S11-S18 of a preferred method of detecting a leakage in a hydrogen refueling station HRS. In a first step S11, a first representation of hydrogen density is established for the hydrogen storage tanks HST of the hydrogen refueling station HRS. This density is established on the basis of measurements of pressure and temperature of the hydrogen stored in the tanks HST. At a later time, in a second step S12, a second representation of hydrogen density is established for the hydrogen storage tanks HST. This second representation is also established on the basis of measurements of pressure and temperature of the stored hydrogen. In a following step S13, a relative difference RD is calculated, as the ratio of the two established representations of hydrogen density.

The method then proceeds with comparing the calculated relative difference RD in a number of steps. In this example, the method utilizes two threshold differences TD; a first threshold difference TD1 used for detection of a small leakage, such as a leakage not exceeding a reduction in hydrogen density of 0.5 percent over a time period of 30 minutes, and a second threshold difference TD2 used for detection of a greater leakage.

In a step S14, it is determined whether the second threshold difference TD2 is exceeded. If so, the method proceeds with step S15 where an alarm is triggered. If the second threshold difference TD2 is not exceeded, the method proceeds with step S16 where it is determined whether the first threshold difference TD1 is exceeded. If so, a warning signal is triggered in a step S17. If the first threshold difference TD1 is not exceeded, then nothing occurs (see step S18). The method is repeated in a continuous manner such that the hydrogen refueling station HRS is monitored over time.

Examples of comparisons of relative differences with a first threshold difference TD1 and a second threshold difference TD2 are shown in FIGS. 5c-d.

FIG. 8 shows an embodiment of the disclosure. The graph of FIG. 8 illustrates an isothermal curve for hydrogen density as a function of hydrogen pressure. The graph represents data retrieved from NIST (National Institute of Standards and Technology) which may be used, according to embodiments of the disclosure, for establishing a representation of hydrogen density. The data shows hydrogen density (in units of kilo per meter cubed) as a function of hydrogen pressure (in units of bar) for a fixed hydrogen temperature of 20 degrees Celsius. Similar curves may be plotted for other temperatures, such that a value of hydrogen density can be determined for any set of values of hydrogen pressure and temperature. In this sense, the curve shown in FIG. 8 may be extended along an axis perpendicular to the plane of the drawing, such that the density is illustrated as a density plot over two coordinates; pressure and temperature. According to embodiments of the disclosure, the step of establishing a representation of density may be performed on the basis of measurements of hydrogen temperature and pressure, and by looking up in a table or plot of densities, it is possible to correlate measurements of pressure and temperature with a corresponding hydrogen density. For example, if the temperature is measured at 20 degrees Celsius at a pressure of 500 bar, the density can be found to be (using FIG. 8) around 31 kg/m3 (kilos per meter cubed).

When a hydrogen storage tank HST is at rest, i.e. the tank is neither filled with hydrogen nor emptied from hydrogen during refueling of a vehicle, the leak rate of the storage tank can be estimated using the following equation:

$$\dot{m} = \frac{\Delta \rho \cdot V}{t}$$

where $\dot{m}$ is the leak rate, $\Delta\rho$ is the change in density in the hydrogen storage tank, caused by change in pressure and temperature in the hydrogen storage tank, V is the volume of the hydrogen storage tank, and t is the time since measurements began.

The above equation may be rewritten to:

$$\frac{\rho}{t} = \frac{\dot{m}}{V}$$

The right-hand side of the above rewritten equation is constant because desired detectable leak rates for e.g. a warning and/or an alarm are determined by equipment manufacturer, and because the volume of the hydrogen storage tank is constant and can only change in case the particular hydrogen storage tank is upgraded or downgraded.

The variables on the left-hand side of the above rewritten equation are determined carefully, such that the left-hand side of the equation becomes greater than the right-hand side of the equation in the event of a leak, the density difference is large enough to avoid spurious trips from sensor fluctuations and the detection time shall not require hours to validate storage tank integrity.

This means than an alarm shall be issued if the below inequality is fulfilled:

$$\frac{\Delta\rho_{alarm}}{t_{alarm}} > \frac{\dot{m}_{alarm}}{V_{Tank}}$$

The above equation also holds for warnings in which case the subscripts should read "warning".

Example: An equipment manufacturer determines an alarm leak rate of $\dot{m}_{alram}=1\cdot 10^{-4}$ kg/s for a hydrogen storage tank with a volume of $V_{Tank}=1$ m³. Below are shown three options for choosing $\Delta\rho_{alram}$ and $t_{alarm}$.

| Option | $\Delta\rho_{alarm}$ | $t_{alarm}$ |
|---|---|---|
| 1 | $1.0 \cdot 10^{-4}$ kg/m³ | 1 s |
| 2 | $1.8 \cdot 10^{-1}$ kg/m³ | 1800 s |
| 3 | $1.0 \cdot 10^{0}$ kg/m³ | 10000 s |

As seen in the above, the value $$\frac{\Delta\rho_{alarm}}{t_{alarm}}$$

remains the same for all the three options, and thus an alarm would be initiated in all of the three example options if the change in density is exceeded for the respective time periods, i.e. 1 second, 1800 seconds and 10000 seconds.

Evaluation of Options:

The three above options are evaluated for a 200 bar hydrogen storage tank storing hydrogen fuel at a temperature of 15 degrees Celsius.

200 bar hydrogen storage tank

| | | Pressure [bar] | Temperature [degrees C.] | Density [kg/m3] | Threshold difference [M2/M1] |
|---|---|---|---|---|---|
| Option 1 | M1 | 200.000 | 15.00 | 14.94 | |
| | M2 | 199.999 | 15.00 | 14.94 | |
| | Difference | 0.0007% | | $1.0 \cdot 10^{-4}$ | 1 |
| Option 2 | M1 | 200.000 | 15.00 | 14.94 | |
| | M2 | 197.280 | 15.00 | 14.76 | |
| | Difference | 1.36% | | $1.8 \cdot 10^{-1}$ | 0.988 |
| Option 3 | M1 | 200.000 | 15.00 | 14.94 | |
| | M2 | 184.980 | 15.00 | 13.94 | |
| | Difference | 7.51% | | $1.0 \cdot 10^{0}$ | 0.933 |

The table shows two measurements M1 and M2 separated in time by a time period TP which, for each option, corresponds to the values of $t_{alram}$, i.e. 1 second for option 1, 1800 seconds for option 2, and 10000 seconds for option 3. The first measurement M1 shows a pressure of 200 bar and a temperature of 15 degrees Celsius in all three options. The evaluation of the first option shows that for a time period TP of 1 second an alarm should be triggered when the pressure has reduced more than 0.0007% by the second measurement M2, however such a small reduction in pressure may easily be attributed to pressure sensor fluctuations and thus option 1 does not represent a truly reliable detection scheme. On the contrary, option 3 which makes use of a time period of 10000 seconds (almost three hours) shows that an alarm has to be triggered when the reduction in pressure exceeds 7.51% (or similarly, when a relative difference RD in density is determined to be below a threshold difference TD of 0.933). A reduction in pressure of 7.51% is well outside the typical range of pressure sensor fluctuations and can therefore, with great certainty, be attributed to a leakage. However, the detection scheme of option 3 requires the hydrogen storage tank to be at rest for almost three hours to determine whether a leakage is present. For practical reasons this may not be a viable option. Option 2 which uses a time period TP between measurements M1 and M2 of 1800 seconds seems to be a good compromise between the two extremes of option 1 and 3, since a reduction in pressure of 1.36% is still well outside of the range of typical pressure fluctuations and a time period TP of 1800 seconds (30 minutes) is a more acceptable time frame since it is more likely that hydrogen is not discharged from a storage tank, or filled into the storage tank, within 30 minutes than 3 hours. The detection scheme of option 2 is thus characterized by a threshold difference TD in density of 0.988.

To achieve continuous monitoring of one or more hydrogen storage tanks HST of a hydrogen refueling station HRS, according to embodiments of the disclosure, the method thus requires establishing detection periods, i.e. time periods TP, lasting $t_{alarm}$. At the beginning of each time period TP, the current density is used as a reference point ($\Delta\rho_{Reference}$) from which a lower boundary is established corresponding to:

$$\Delta\rho_{low} = \rho_{Reference} - \Delta\rho_{Alarm}$$

Figure 9:
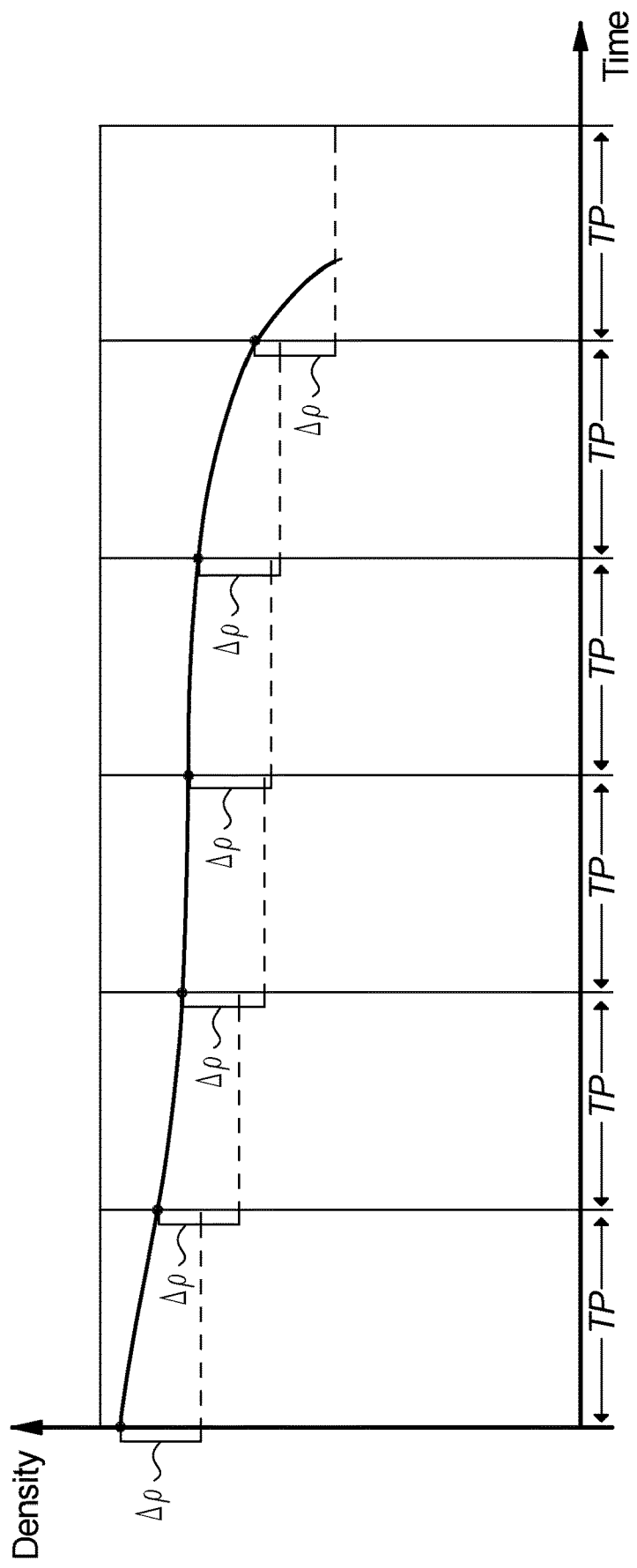
FIG. 9 illustrates a continuous detection of a leakage of a hydrogen storage tank according to embodiments of the disclosure.

If the density goes below the $\Delta\rho_{low}$ boundary at any moment within a time period TD, an alarm (or warning) should be triggered. This continuous density-based monitoring of a leakage is shown in FIG. 9. As seen in the figure, the density (illustrated by the curve) is within the range of density changes given by $\Delta\rho$, the lower limit of which is calculated using the above formula. It is seen that for the first five time periods TP the density remains within the accepted ranges, however during the course of the last time period, the density has decreased below the lower acceptable limit. Thus, by the end of the last time period TP shown in the figure, a new establishment of density will reveal that the density is too low and thus an alarm (or warning) is triggered.

From the above, it is clear that the range of acceptable changes in density Δρ (depicted in FIG. 9) may equally well be represented by a threshold difference TD, where the threshold difference TD is a lower boundary to the acceptable ranges of a relative difference RD in density.

When in use, such as when implemented in a controller of a hydrogen refueling station, the method of detection of leakage of pressurized gas (in particular hydrogen gas) in a hydrogen refueling station and particularly in hydrogen storage tanks (HRS) thereof, it is important to account for pressure decreases caused by decreasing gas temperature due to an external source, such as ambient temperature "soaking" the pressurized gas volume.

Note that the gas pressure would increase as function of increasing ambient temperature, but since this is hard to confuse with a gas leak, this is aspect is not described in further details.

For a close pressurized gas volume such as a hydrogen storage tank with a particular Initial Temperature Level ($T_{init}$) and a particular Initial Pressure Level ($P_{init}$) the absolute pressure change (Delta Pressure, $\Delta\rho_{abs}$) is assumed to be directly correlated with an absolute temperature change (Delta Temperature, $\Delta T_{abs}$) in an isochoric process (no change of volume or mass).

Hence, in an isochoric process, i.e. a process with no change of volume or mass, an absolute temperature change $\Delta T_{abs}$ is directly corelated with an absolute pressure change $\Delta P_{abs}$.

Figure 10:
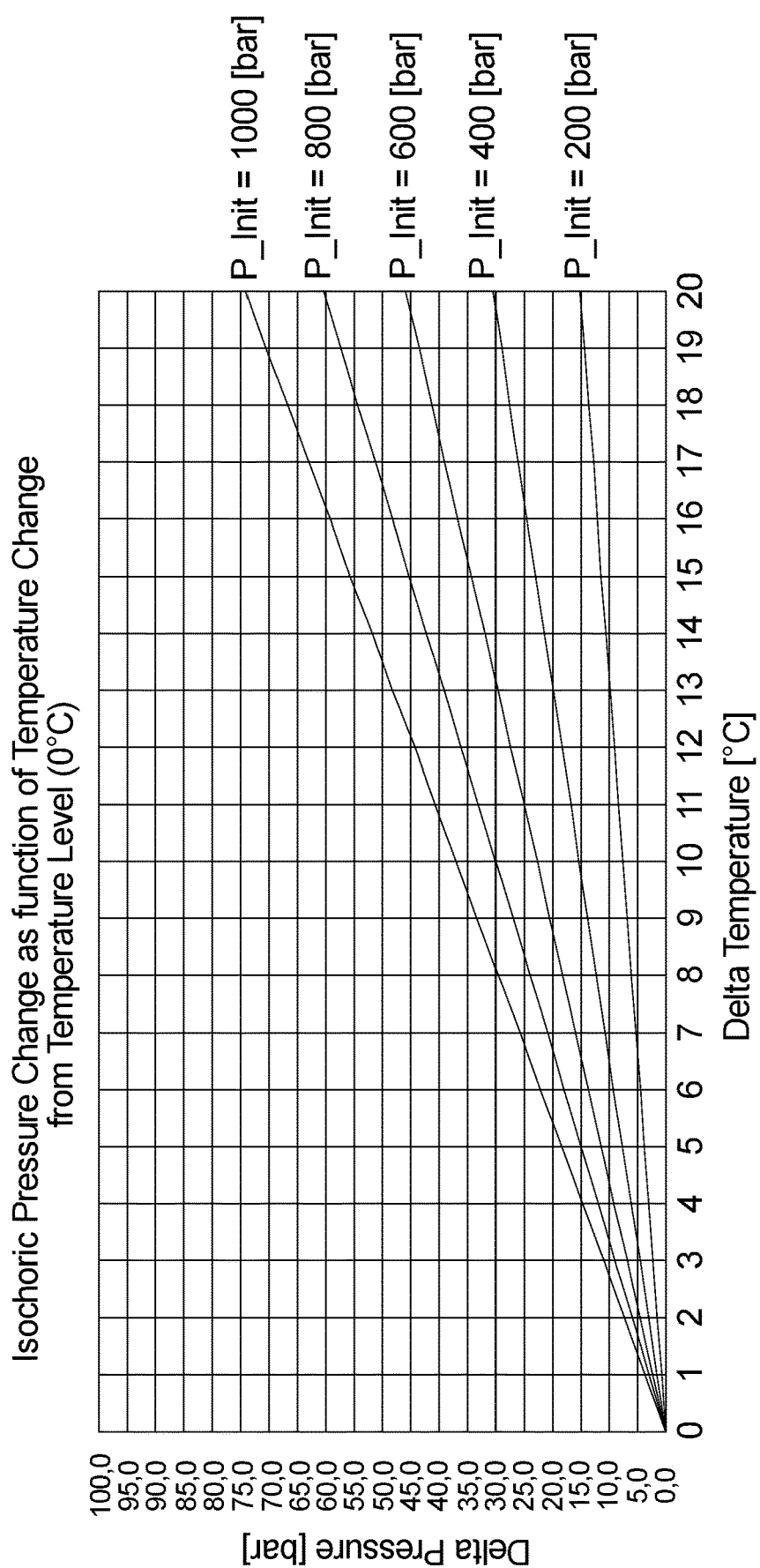
FIGS. 10 and 11 illustrates pressure change as function of temperature change from different temperature levels.

Accordingly, as illustrated on FIG. 10, for multiple values of $P_{init}$ at one particular $T_{init}$ (0° C. in FIG. 10), the trendlines for pressure change diverges. One example, that can be established from FIG. 10 is that if the initial pressure in a vessel is 1000 bar, then the pressure in the vessel change 15 bar, if the temperature changes 4° C.

Figure 11:
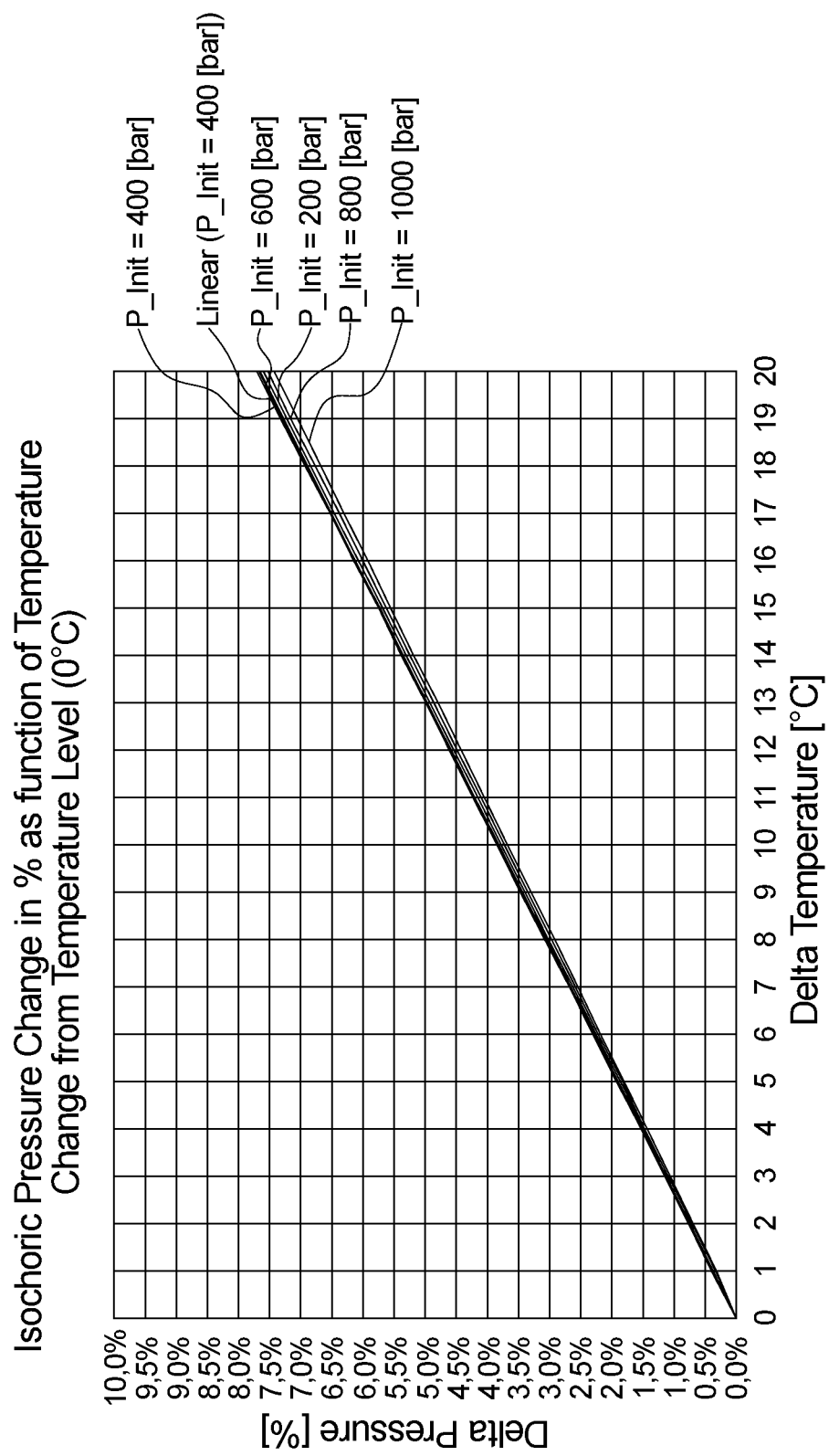

Scaling the absolute trends as percentage-wise changes of pressure ($\Delta P_\%$), the trends now converge as illustrated on FIG. 11. From FIG. 11 it is found, that independent of the initial pressure in the tank, the percentage pressure change $\Delta P_\%$ is the same for all values of Delta Temperature $\Delta T_{abs}$. I.e. at any initial pressure we expect the same percentage pressure change due to a change in temperature.

Since $\Delta P_\%$ is independent of $P_{init}$ at any values of $T_{init}$, the same exercise can now be performed for multiple values of ($T_{init}$). From the result illustrated on FIG. 12 it is seen, that inconveniently, the trendlines diverges. The deviation is illustrated by different gradients of the trendlines and the gradient coefficients illustrated for each of the trendlines. From FIG. 12 it is found, that the initial temperature in the tank influences the percentage pressure change in the tank. Hence, if the initial temperature is minus 40° C. and the temperature changes 15° C., then the pressure in the vessel will change by close to 7% whereas, if the initial temperature is plus 60° C. and the temperature changes 15° C., then the pressure in the vessel will change by just above 4.5%.

Figure 12:
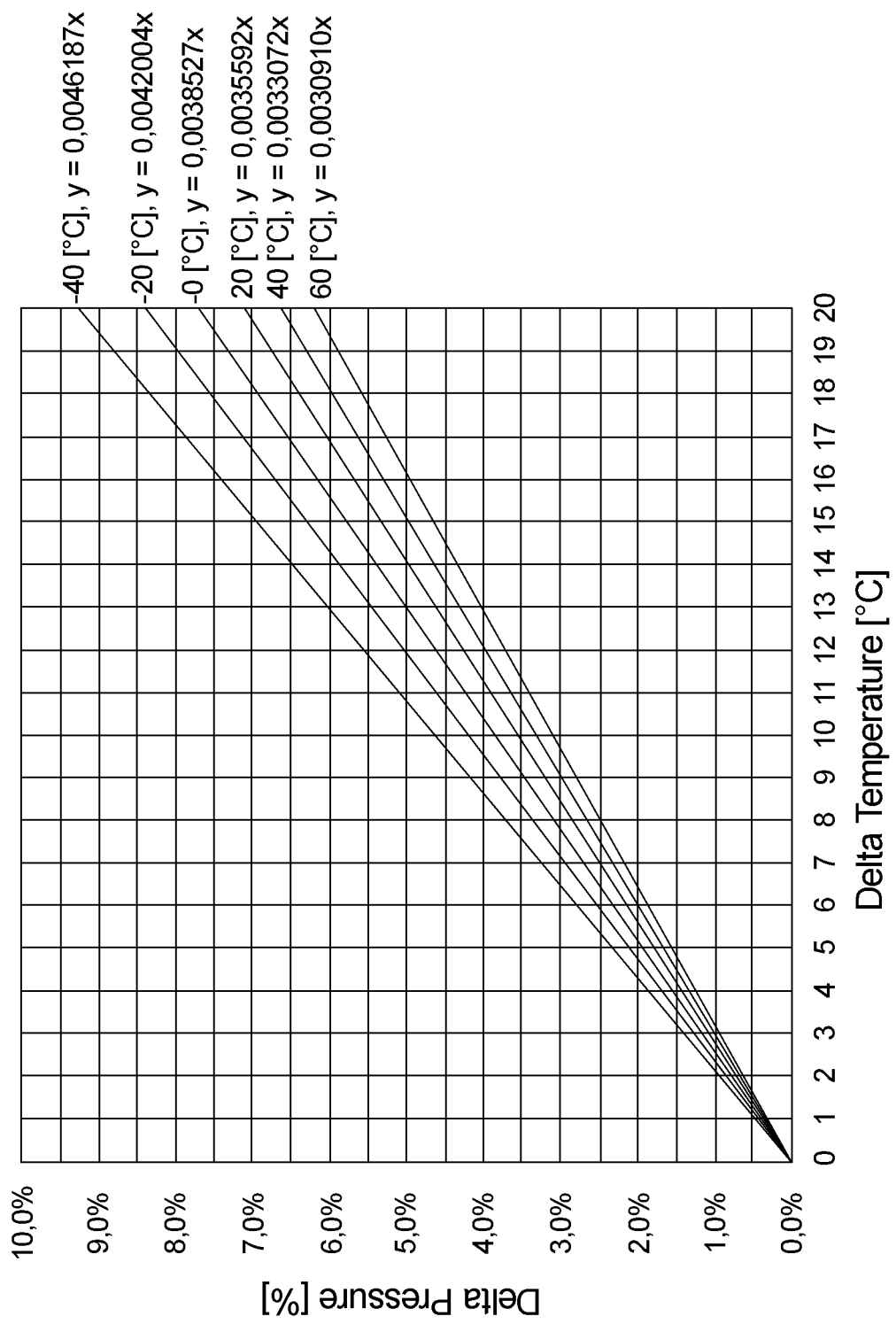
FIG. 12 illustrates pressure change in percentage of temperature change from different temperature levels and FIG. 13 Illustrates coefficients dependent on ambient temperature.
Figure 13:
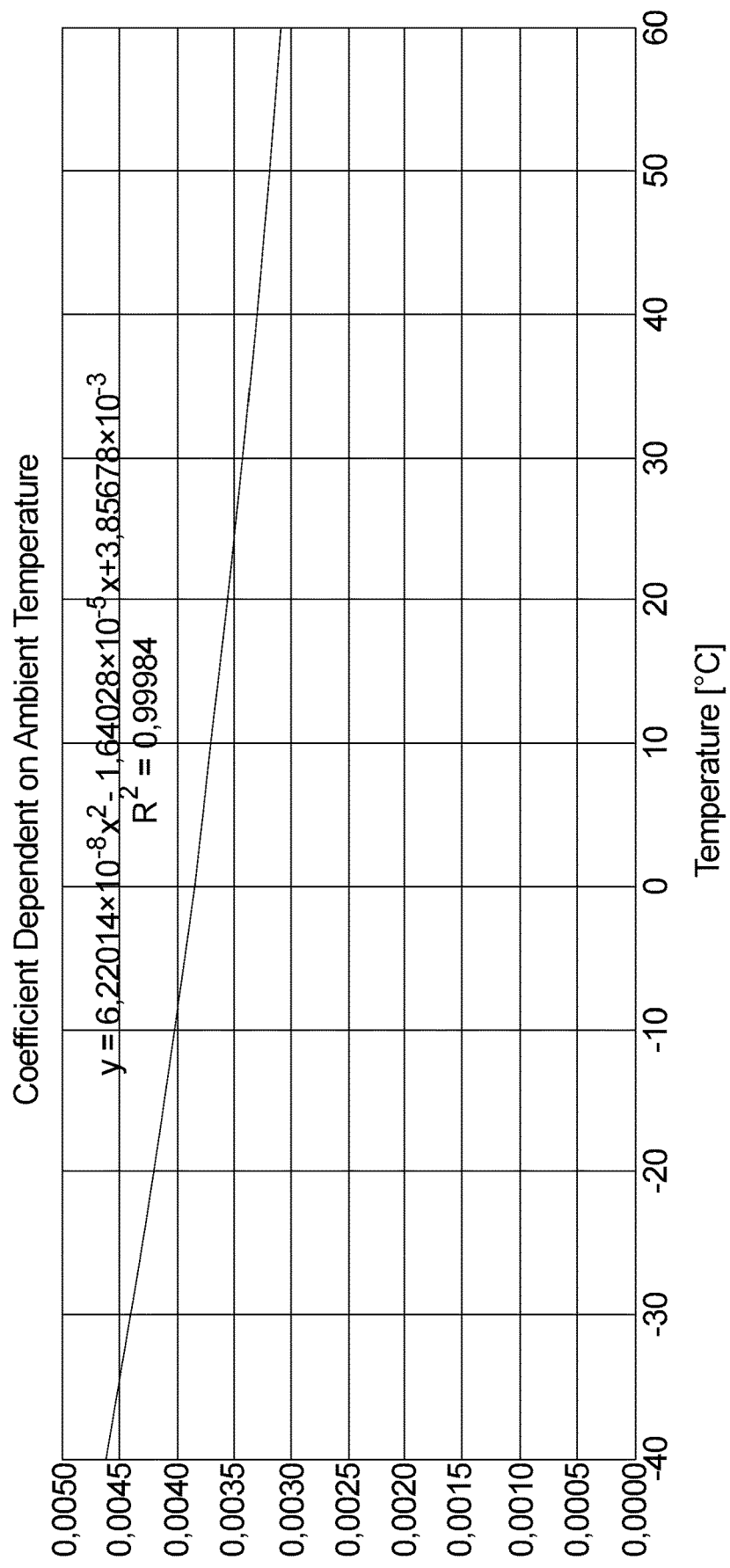

Since all trendlines illustrated on FIG. 12 intersects with (0° C., 0%), a mathematical expression, which can account for any Temperature Levels, can be plotted, based on the coefficients of the trendlines from FIG. 12, to estimate a polynomial as illustrated on FIG. 13.

From the polynomial illustrated on FIG. 13, an equation for determining percentage-wise pressure change can be derived:

$$\Delta P_\% = (a \cdot T_{init}^2 b \cdot T_{init} + c) \cdot \Delta T_{abs}$$

where:
a: coefficient=$6.22014122960334 \cdot 10^{-8}$
b: coefficient=$-1.64028207828121 \cdot 10^{-5}$
c: coefficient=$3.85677524487202 \cdot 10^{-3}$ By the equation for determining the percentage-wise pressure change $\Delta P_\%$, it is now possible to predict the gradient on trendlines for any ambient temperature i.e.

for any initial temperature i.e. the percentage pressure change for any ambient temperature. This is done by inserting an initial temperature (i.e. a temperature measured at time T1) and a Delta Temperature (i.e. the difference between the temperature measure at time T1 and a temperature measured at time T2) in the polynomial equation.

The time period between time T1 and time T2 should be chosen based on considerations of which kind of leakage should be detected. Hence in a non-limiting example, if the purpose is to detect minor leakages, the time between T1 and T2 should be short e.g. measured in minutes below 1 hour such as 10 to 15 minutes, whereas if large leakages are to be detected, the time period between T1 and T2 should be longer e.g. measured in hours below 2 hours. A non-limiting example of what could lead to a minor leakage is worn components and a non-limiting example of what could lead to a large leakage is a hole in a pipe or vessel. Hence, a minor and larger leakage may occur due to the same fault, error or the like and may be categorized as the one or the other depending on the flow escaping the hydrogen pipe and vessel system.

By using the above polynomial equation calculation of a number of trendlines and performing interpolation therebetween is avoided. Accordingly, a fast and precise way of establishing percentage pressure change as function of ambient temperature (initial temperature) and change in ambient temperature (delta temperature) is established.

When the percentage pressure change $\Delta P_\%$ is established as described above, the absolute pressure change $\Delta P_{abs}$ can be established by multiplying the initial pressure $P_{initial}$. Hence, the absolute pressure change can be found according to the following equation:

$$\Delta P_{abs} = P_{init} \cdot \Delta P_\%$$

The impact of these results, is that a software implementable routine, based on the above equations and coefficients, which when executed in a controller of e.g. a hydrogen refueling station, can carrying out a leak check of a pressurized gas volume such as the hydrogen storage tank. Such software implementable routine is able to qualify whether a measured pressure decrease established during a leak check ($\Delta P_{LeakCheck}$) is caused by an external temperature factor such as ambient temperature or it is indeed a gas leak.

$\Delta P_{LeakCheck}$ is determined as the pressure difference between measurements of pressure made at time T1 and time T2. Hence:

if $\Delta P_{LeakCheck} < \Delta P_{abs}$ then: Pressure decrease by external factor, and if $\Delta P_{LeakCheck} > \Delta P_{abs}$ then: Pressure decrease by leak!

Accordingly, if the $\Delta P_{LeakCheck}$ is below the calculated pressure change as consequence of change of temperature no leakage is indicated, whereas if $\Delta P_{LeakCheck}$ is above this calculated pressure change, a leakage is indicated.

Note that, if the pressure change $\Delta P$ in percentage becomes negative, than the $\Delta P_{abs}$ also becomes negative and it is especially in this scenario it becomes difficult to distinguish between a leakage and a change of temperature. The other way around, if $\Delta P_{abs}$ is positive and an negative $\Delta P_{LeakCheck}$ is observed, a leakage is present.

In principle, a leakage detection method as describe above can be used to determine if one single storage tank is leaking, however the validity of the method is increased if the leakage detection method is used to determine pressure change of a plurality of different storage tanks and compare these pressure changes to identify outliers.

Most likely, storage tanks having such outliers are leaking, however if only one of a plurality of storage tanks is located in the sun while the rest is in the shadow, then pressure change of that storage tank may be identified as an outlier. Therefore, in addition to the above, it is preferred to add metadata to the individual storage tanks such as if sun at a given time during a given day in the year could cause a difference in temperature and thereby in pressure change.

For a controller of e.g. a hydrogen refueling station to be able to validate if an outlier is caused by sun or leakage, a photovoltaic sensor may provide input to the controller to account for sunlight. In the same way other factors than direct sunlight may be accounted for by the controller implementing the above described detection method.

It should be mentioned that the coefficients above include a several digits after the comma, however coefficients with such high precision may not always be necessary to use the method to get a usable and reliable indication of leakage from a storage tank.

From the above description, it is now clear that the present disclosure relates to determining if a hydrogen storage tank comprising e.g. hydrogen gas or other gaseous fluids are leaking. More specific, by monitoring change of pressure inside each of a plurality of hydrogen storage tanks and compare these measured pressure values, it is possible to determine if pressure in one tank deviates from the pressure in the majority of tanks. If this is the case, a leakage is indicated. If not, pressure changes in the tanks may relate to change in ambient temperature.

The invention claimed is:

1. A method of detecting a leakage in a hydrogen refuelling station comprising a plurality of hydrogen storage tanks, said method comprising the steps of:
   establishing at a first time a first representation of at least one fluid parameter associated with hydrogen for at least one of said plurality of hydrogen storage tanks;
   establishing at a second time a second representation of said at least one fluid parameter for said at least one of said plurality of hydrogen storage tanks;
   determining a relative difference between said first and second representation of said at least one fluid parameter;
   for said at least one hydrogen storage tank comparing said relative difference with a threshold difference to detect a leakage in said at least one hydrogen storage tank,
   wherein said at least one fluid parameter comprises density, and wherein said density is established on the basis of measurements of pressure and temperature.

2. The method of detecting a leakage of claim 1, wherein each step of establishing said at least one fluid parameter comprises establishing said at least one fluid parameter for each of said plurality of hydrogen storage tanks, wherein said step of determining a relative difference between said first and second representation of said at least one fluid parameter comprises determining said relative difference between said first and second representation of said at least one fluid parameter for each of said plurality of hydrogen storage tanks.

3. The method of detecting a leakage of claim 1, wherein said threshold difference is a first threshold difference, and wherein said step of comparing said relative difference with a threshold difference furthermore comprises comparing said relative difference with a second threshold difference to detect a leakage greater than a leakage characterized by a relative difference exceeding said first threshold difference and not said second threshold difference.

4. The method of detecting a leakage of claim 1, wherein said threshold difference is applicable for a time period defined by one or more predetermined time periods.

5. The method of detecting a leakage of claim 1, wherein said threshold difference is predetermined on the basis of a volume of said at least one hydrogen storage tank and a leak rate.

6. The method of detecting a leakage of claim 1, wherein said threshold difference is in the range of 0.1 to 2 percent of the volume of said at least one hydrogen storage tank.

7. The method of detecting a leakage of claim 1, wherein a leakage is detected when at least one relative difference is outside a range of acceptable values of relative difference, said range being limited in at least one end by said threshold difference.

8. The method of detecting a leakage of claim 1, wherein said steps of establishing a representation of a least one fluid parameter is performed following an expiration of a settling time.

9. The method of detecting a leakage of claim 1, wherein the method further comprises receiving measurements in the form of sensor data of said at least one fluid parameter in a memory associated with a controller via a data communication link, wherein said step of determining a relative difference between a first and a second measurement of said at least one fluid parameter is carried out by said controller, and wherein said step of comparing said relative difference with said threshold difference to detect a leakage in said at least one hydrogen storage tank is carried out by said controller.

10. The method of detecting a leakage of claim 1, wherein the at least one fluid parameter is density and wherein the method of claim 1 furthermore comprises the steps of:
   · establishing the density of hydrogen gas in each of a plurality of hydrogen storage tanks,
   compare the established densities, and
   indicate the presence of a leakage if at least one of the established densities deviates from the majority of established densities by a deviation threshold value.

11. The method of detecting a leakage of claim 1, wherein a percentage pressure change caused by a temperature change is established according to the following equation:

$$\Delta P_\% = (a \cdot T_{init}^2 b \cdot T_{init} + c) \cdot \Delta T_{abs}.$$

12. The method of determining a leakage according to claim 11, wherein an absolute pressure change is established according to the following equation:

$$\Delta P_{abs} = P_{init} \cdot \Delta P_\%.$$

13. The method of determining a leakage according to claim 12,
   wherein a leakage is indicated if:

$$\Delta P_{LeakCheck} > \Delta P_{abs}$$

wherein $\Delta P_{LeakCheck}$ is a pressure change established based on measurements of pressure of a storage tank at a first time T1 and a second time T2.

* * * * *